(12) United States Patent
Fan et al.

(10) Patent No.: US 9,903,584 B2
(45) Date of Patent: Feb. 27, 2018

(54) SYSTEMS FOR CONVERTING FUEL

(75) Inventors: Liang-Shih Fan, Columbus, OH (US);
Hyung R. Kim, Columbus, OH (US);
Fanxing Li, Columbus, OH (US);
Liang Zeng, Columbus, OH (US);
Dawei Wang, Columbus, OH (US); Fei Wang, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 688 days.

(21) Appl. No.: 14/116,636

(22) PCT Filed: May 11, 2012

(86) PCT No.: PCT/US2012/037544
§ 371 (c)(1),
(2), (4) Date: Nov. 8, 2013

(87) PCT Pub. No.: WO2012/155054
PCT Pub. Date: Nov. 15, 2012

(65) Prior Publication Data
US 2014/0072917 A1 Mar. 13, 2014

Related U.S. Application Data

(60) Provisional application No. 61/485,010, filed on May 11, 2011.

(51) Int. Cl.
*F23C 10/01* (2006.01)
*F23C 10/00* (2006.01)
(Continued)

(52) U.S. Cl.
CPC ............. *F23C 10/005* (2013.01); *B01J 8/002* (2013.01); *B01J 8/12* (2013.01); *B01J 8/125* (2013.01);
(Continued)

(58) Field of Classification Search
CPC ........ F23C 10/005; F23C 10/06; F23C 10/01; F23C 10/02; F23C 2206/101;
(Continued)

(56) References Cited

U.S. PATENT DOCUMENTS

| | | |
|---|---|---|
| 971,206 A | 9/1910 | Messerschmitt |
| 1,078,686 A | 11/1913 | Lane |

(Continued)

FOREIGN PATENT DOCUMENTS

| | | |
|---|---|---|
| CN | 1329761 | 1/2001 |
| CN | 1454711 | 10/2003 |

(Continued)

OTHER PUBLICATIONS

EP 0161970 A1—English machine translation.*
(Continued)

*Primary Examiner* — Jorge Pereiro
(74) *Attorney, Agent, or Firm* — Michael Best & Friedrich LLP

(57) ABSTRACT

A system for converting fuel may include a first moving bed reactor, a second reactor, and a non-mechanical valve. The first moving bed reactor may include at least one tapered section and multiple injection gas ports. The multiple injection gas ports may be configured to deliver a fuel to the first moving bed reactor. The first moving bed reactor may be configured to reduce an oxygen carrying material with a fuel by defining a countercurrent flowpath for the fuel relative to the oxygen carrying material. The second reactor may communicate with the first moving bed reactor and may be operable to receive an oxygen source. The second reactor may be configured to regenerate the reduced oxygen carrying material by oxidation.

12 Claims, 20 Drawing Sheets

(51) Int. Cl.
*C01B 3/22* (2006.01)
*C10J 3/72* (2006.01)
*F23C 10/04* (2006.01)
*F23C 10/20* (2006.01)
*F23C 10/32* (2006.01)
*B01J 8/18* (2006.01)
*B01J 8/38* (2006.01)
*B01J 8/00* (2006.01)
*B01J 8/32* (2006.01)
*C10J 3/06* (2006.01)
*B01J 8/12* (2006.01)

(52) U.S. Cl.
CPC ............... *B01J 8/1827* (2013.01); *B01J 8/32* (2013.01); *B01J 8/388* (2013.01); *C01B 3/22* (2013.01); *C10J 3/06* (2013.01); *C10J 3/721* (2013.01); *C10J 3/723* (2013.01); *C10J 3/725* (2013.01); *F23C 10/04* (2013.01); *F23C 10/20* (2013.01); *F23C 10/32* (2013.01); *B01J 2208/0061* (2013.01); *B01J 2208/00061* (2013.01); *B01J 2208/0084* (2013.01); *B01J 2208/00513* (2013.01); *B01J 2208/00557* (2013.01); *B01J 2208/00654* (2013.01); *B01J 2208/00778* (2013.01); *B01J 2208/00902* (2013.01); *B01J 2208/00938* (2013.01); *C10J 2300/1807* (2013.01)

(58) Field of Classification Search
CPC .. F23C 2900/99008; F23C 2900/10005; F23C 3/00
USPC .............................................. 431/7; 110/245
See application file for complete search history.

(56) References Cited

U.S. PATENT DOCUMENTS

| | | |
|---|---|---|
| 1,658,939 A | 2/1928 | Parsons |
| 2,182,747 A | 12/1939 | Marshall, Jr. |
| 2,198,560 A | 4/1940 | Marshall, Jr. |
| 2,449,635 A | 9/1948 | Barr |
| 2,614,067 A | 10/1952 | Reed et al. |
| 2,635,947 A | 4/1953 | Reed et al. |
| 2,686,819 A | 8/1954 | Johnson |
| 2,694,622 A | 11/1954 | Reed et al. |
| 2,697,686 A | 12/1954 | Leffer |
| 2,899,374 A | 8/1959 | Gomory |
| 3,027,238 A | 3/1962 | Watkins |
| 3,031,287 A | 4/1962 | Benson et al. |
| 3,338,667 A | 8/1967 | Pundsack |
| 3,353,925 A | 11/1967 | Baumann et al. |
| 3,421,869 A | 1/1969 | Benson |
| 3,442,613 A | 5/1969 | Grotz, Jr. |
| 3,442,619 A | 5/1969 | Huebler et al. |
| 3,442,620 A | 5/1969 | Huebler et al. |
| 3,494,858 A | 2/1970 | Luckenbach |
| 3,523,821 A | 8/1970 | Bryce et al. |
| 3,573,224 A | 3/1971 | Strelzoff et al. |
| 3,619,142 A | 11/1971 | Johnson et al. |
| 3,726,966 A | 4/1973 | Johnston |
| 4,017,270 A | 4/1977 | Funk et al. |
| 4,057,402 A | 11/1977 | Patel et al. |
| 4,108,732 A | 8/1978 | Nuttall, Jr. |
| 4,272,399 A | 6/1981 | Davis et al. |
| 4,325,833 A | 4/1982 | Scott |
| 4,334,959 A | 6/1982 | Green |
| 4,343,624 A | 8/1982 | Belke et al. |
| 4,348,487 A | 9/1982 | Goldstein et al. |
| 4,404,086 A | 9/1983 | Oltrogge |
| 4,420,332 A | 12/1983 | Mori et al. |
| 4,521,117 A | 6/1985 | Ouwerkerk et al. |
| 4,778,585 A | 10/1988 | Graff |
| 4,842,777 A | 6/1989 | Lamort |
| 4,861,165 A | 8/1989 | Fredriksson et al. |
| 4,869,207 A | 9/1989 | Engstrom et al. |
| 4,902,586 A | 2/1990 | Wertheim |
| 4,895,821 A | 6/1990 | Kainer et al. |
| 5,130,106 A | 7/1992 | Koves et al. |
| 5,365,560 A | 11/1994 | Tam |
| 5,447,024 A | 9/1995 | Ishida et al. |
| 5,509,362 A | 4/1996 | Lyon |
| 5,518,187 A | 5/1996 | Bruno et al. |
| 5,529,599 A | 6/1996 | Calderon |
| 5,630,368 A | 5/1997 | Wagoner |
| 5,730,763 A | 3/1998 | Manulescu et al. |
| 5,770,310 A | 6/1998 | Noguchi et al. |
| 5,827,496 A | 10/1998 | Lyon |
| 5,858,210 A | 1/1999 | Richardson |
| 6,007,699 A | 12/1999 | Cole |
| 6,143,203 A | 11/2000 | Zeng et al. |
| 6,143,253 A | 11/2000 | Radcliffe et al. |
| 6,180,354 B1 | 1/2001 | Singh et al. |
| 6,187,465 B1 | 2/2001 | Galloway |
| 6,361,757 B1 | 3/2002 | Shikada et al. |
| 6,395,944 B1 | 5/2002 | Griffiths |
| 6,412,559 B1 | 7/2002 | Gunter et al. |
| 6,444,712 B1 | 9/2002 | Janda |
| 6,494,153 B1 | 12/2002 | Lyon |
| 6,509,000 B1 | 1/2003 | Choudhary et al. |
| 6,517,631 B1 | 2/2003 | Bland |
| 6,631,698 B1 | 10/2003 | Hyppanen et al. |
| 6,642,174 B2 | 11/2003 | Gaffney et al. |
| 6,663,681 B2 | 12/2003 | Kindig et al. |
| 6,667,022 B2 | 12/2003 | Cole |
| 6,669,917 B2 | 12/2003 | Lyon |
| 6,682,714 B2 | 1/2004 | Kindig et al. |
| 6,685,754 B2 | 2/2004 | Kindig et al. |
| 6,703,343 B2 | 3/2004 | Park |
| 6,797,253 B2 | 9/2004 | Lyon |
| 6,834,623 B2 | 12/2004 | Cheng |
| 6,875,411 B2 | 4/2005 | Sanfilippo et al. |
| 6,880,635 B2 | 4/2005 | Vinegar et al. |
| 6,936,363 B2 | 8/2005 | Kordesch et al. |
| 7,001,579 B2 | 2/2006 | Metzger et al. |
| 7,244,399 B2 | 7/2007 | Myohanen et al. |
| 7,404,942 B2 | 7/2008 | Sanfilippo et al. |
| 7,496,450 B2 | 2/2009 | Ortiz Aleman et al. |
| 7,749,626 B2 | 7/2010 | Take |
| 7,767,191 B2 | 8/2010 | Thomas et al. |
| 7,837,975 B2 | 11/2010 | Iyer et al. |
| 7,840,053 B2 | 11/2010 | Liao |
| 8,116,430 B1 | 2/2012 | Shapiro et al. |
| 8,192,706 B2 | 6/2012 | Grochowski |
| 8,202,349 B2 | 6/2012 | Molaison |
| 8,419,813 B2 | 4/2013 | Hoteit et al. |
| 8,435,920 B2 | 5/2013 | White et al. |
| 8,508,238 B2 | 8/2013 | Mahalingam et al. |
| 8,761,943 B2 | 6/2014 | Lou et al. |
| 8,771,549 B2 | 7/2014 | Gauthier et al. |
| 8,814,963 B2 | 8/2014 | Apanel et al. |
| 8,877,147 B2 | 11/2014 | Fan et al. |
| 9,376,318 B2 | 6/2016 | Fan et al. |
| 9,616,403 B2 | 4/2017 | Fan et al. |
| 2001/0055559 A1 | 12/2001 | Sanfilippo et al. |
| 2002/0011428 A1 | 1/2002 | Scheuerman |
| 2002/0179887 A1 | 12/2002 | Zeng et al. |
| 2003/0006026 A1 | 1/2003 | Matsumoto et al. |
| 2003/0024388 A1 | 2/2003 | Scharpf |
| 2003/0031291 A1 | 2/2003 | Yamamoto et al. |
| 2003/0119658 A1 | 6/2003 | Allison et al. |
| 2003/0130360 A1 | 7/2003 | Kindig et al. |
| 2003/0180215 A1 | 9/2003 | Niu et al. |
| 2003/0188668 A1 | 10/2003 | Bland |
| 2004/0028181 A1 | 2/2004 | Charles, Jr. et al. |
| 2004/0030214 A1 | 2/2004 | Schindler et al. |
| 2004/0109800 A1 | 6/2004 | Pahlman et al. |
| 2004/0126293 A1 | 7/2004 | Geerlings et al. |
| 2004/0131531 A1 | 7/2004 | Geerlings et al. |
| 2004/0132833 A1 | 7/2004 | Espinoza et al. |
| 2004/0138060 A1 | 7/2004 | Rapier et al. |
| 2004/0152790 A1 | 8/2004 | Cornaro et al. |
| 2004/0154223 A1 | 8/2004 | Powell et al. |

(56) References Cited

U.S. PATENT DOCUMENTS

| | | |
|---|---|---|
| 2004/0197612 A1 | 10/2004 | Keefer et al. |
| 2004/0213705 A1 | 10/2004 | Blencoe et al. |
| 2004/0233191 A1 | 11/2004 | Mukherjee et al. |
| 2004/0244289 A1 | 12/2004 | Morozumi et al. |
| 2004/0265224 A1 | 12/2004 | Papavassiliou et al. |
| 2005/0002847 A1 | 1/2005 | Maroto-Valer et al. |
| 2005/0054880 A1 | 3/2005 | Dubois et al. |
| 2005/0175533 A1 | 8/2005 | Thomas et al. |
| 2005/0255037 A1 | 11/2005 | Otsuka et al. |
| 2005/0265912 A1 | 12/2005 | Alvarez, Jr. et al. |
| 2005/0274648 A1 | 12/2005 | Goldstein et al. |
| 2006/0021308 A1 | 2/2006 | Merkel |
| 2006/0042565 A1 | 3/2006 | Hu |
| 2006/0094593 A1 | 5/2006 | Beech, Jr. et al. |
| 2007/0010588 A1 | 1/2007 | Pearson |
| 2007/0049489 A1 | 3/2007 | Becue et al. |
| 2007/0157517 A1 | 7/2007 | Tsay et al. |
| 2007/0258878 A1 | 11/2007 | Sanfilippo et al. |
| 2008/0031809 A1 | 2/2008 | Norbeck et al. |
| 2008/0161624 A1 | 7/2008 | Glover et al. |
| 2008/0164443 A1 | 7/2008 | White et al. |
| 2008/0209807 A1 | 9/2008 | Tsangaris et al. |
| 2008/0314838 A1 | 12/2008 | Becker et al. |
| 2009/0000194 A1 | 1/2009 | Fan et al. |
| 2009/0042070 A1 | 2/2009 | Brown et al. |
| 2009/0160461 A1 | 6/2009 | Zangl et al. |
| 2010/0071262 A1 | 3/2010 | Robinson et al. |
| 2010/0184589 A1 | 7/2010 | Miyairi et al. |
| 2010/0187159 A1 | 7/2010 | Naunheimer |
| 2010/0258429 A1 | 10/2010 | Ugolin |
| 2010/0293845 A1 | 11/2010 | Zeman et al. |
| 2010/0332170 A1 | 12/2010 | Gao et al. |
| 2011/0005395 A1 | 1/2011 | Vimalchand et al. |
| 2011/0011720 A1 | 1/2011 | Rinker |
| 2011/0024687 A1 | 2/2011 | White et al. |
| 2011/0054049 A1 | 3/2011 | Lambert et al. |
| 2011/0094226 A1 | 4/2011 | McHugh et al. |
| 2011/0100274 A1 | 5/2011 | Kuske et al. |
| 2011/0146152 A1 | 6/2011 | Vimalchand et al. |
| 2011/0176968 A1 | 7/2011 | Fan et al. |
| 2011/0176988 A1 | 7/2011 | Okamura et al. |
| 2011/0206469 A1 | 8/2011 | Furuyama et al. |
| 2011/0289845 A1 | 12/2011 | Davis et al. |
| 2011/0291051 A1 | 12/2011 | Hershkowitz et al. |
| 2011/0300060 A1 | 12/2011 | Guillou et al. |
| 2011/0303875 A1 | 12/2011 | Hoteit et al. |
| 2012/0159841 A1 | 6/2012 | Fan et al. |
| 2012/0167585 A1 | 7/2012 | Wormser |
| 2012/0171588 A1 | 7/2012 | Fan et al. |
| 2012/0214106 A1 | 8/2012 | Sit et al. |
| 2013/0085365 A1 | 4/2013 | Marashdeh et al. |
| 2013/0149650 A1 | 6/2013 | Gauthier et al. |
| 2013/0255272 A1 | 10/2013 | Ajhar et al. |
| 2014/0034134 A1 | 2/2014 | Fan et al. |
| 2014/0144082 A1 | 5/2014 | Fan et al. |
| 2014/0275297 A1 | 9/2014 | Velazquez-Vargas et al. |
| 2014/0295361 A1 | 10/2014 | Fan et al. |
| 2015/0238915 A1 | 8/2015 | Fan et al. |
| 2016/0002034 A1 | 1/2016 | Fan et al. |
| 2016/0023190 A1 | 1/2016 | Fan et al. |
| 2016/0030904 A1 | 2/2016 | Fan et al. |
| 2016/0268616 A1 | 9/2016 | Fan et al. |
| 2016/0376512 A1 | 12/2016 | Fan et al. |

FOREIGN PATENT DOCUMENTS

| | | | |
|---|---|---|---|
| CN | 1501534 | 6/2004 | |
| CN | 101389734 A | 3/2009 | |
| CN | 101426885 A | 5/2009 | |
| CN | 102187153 | 9/2011 | |
| CN | 102612625 | 7/2012 | |
| EP | 0161970 A1 * | 11/1985 | ............ B01J 8/388 |
| EP | 1134187 A2 | 9/2001 | |
| EP | 1138096 A1 | 10/2001 | |
| EP | 1445018 A1 | 8/2004 | |
| EP | 1580162 A2 | 9/2005 | |
| EP | 1845579 A2 | 10/2007 | |
| EP | 1933087 | 6/2008 | |
| EP | 2450420 | 5/2012 | |
| EP | 2515038 | 10/2012 | |
| EP | 2601443 | 6/2013 | |
| FR | 2924035 | 5/2009 | |
| JP | H10249153 A | 9/1998 | |
| JP | 2006-502957 | 1/2006 | |
| TW | 406055 B | 9/2000 | |
| TW | 426728 B | 3/2001 | |
| WO | WO 1990/13773 | 11/1990 | |
| WO | 1999065097 A1 | 12/1999 | |
| WO | 200022690 A1 | 4/2000 | |
| WO | WO 2000/068339 | 11/2000 | |
| WO | 2001042132 A1 | 6/2001 | |
| WO | WO 2003/070629 | 8/2003 | |
| WO | 2007082089 A2 | 7/2007 | |
| WO | 2007122498 A2 | 11/2007 | |
| WO | WO 2007/134075 | 11/2007 | |
| WO | 2008019079 A2 | 2/2008 | |
| WO | 2008/071215 | 6/2008 | |
| WO | 2008082312 A1 | 7/2008 | |
| WO | WO 2008/115076 | 9/2008 | |
| WO | WO 2009/007200 | 1/2009 | |
| WO | WO 2009/009388 | 1/2009 | |
| WO | 2009021258 A1 | 2/2009 | |
| WO | WO 2009/114309 | 9/2009 | |
| WO | 2010037011 A2 | 4/2010 | |
| WO | 2010063923 A2 | 6/2010 | |
| WO | WO 2010/126617 | 11/2010 | |
| WO | WO 2011/021161 | 2/2011 | |
| WO | WO 2011/031752 | 3/2011 | |
| WO | WO 2011/031755 | 3/2011 | |
| WO | 2011/084734 | 7/2011 | |
| WO | WO 2012/064712 | 5/2012 | |
| WO | WO 2012/077978 | 6/2012 | |
| WO | WO 2012/155054 | 11/2012 | |
| WO | WO 2012/155059 | 11/2012 | |
| WO | WO 2013/040645 | 3/2013 | |
| WO | WO 2014/085243 | 6/2014 | |
| WO | 2011/153568 | 12/2014 | |
| WO | 2014/195904 | 12/2014 | |
| WO | 2016/053941 | 4/2016 | |

OTHER PUBLICATIONS

Fan et al., "Utilization of chemical looping strategy in coal gasification processes", Particuology, vol. 6, pp. 131-142, 2008.

Hildebrandt et al., "Producing Transportation Fuels with Less Work", Science, vol. 323, pp. 1680-1681, Mar. 27, 2009.

Kaiser et al., "Precombusion and Postcombustion Decarbonization", IEEE, Power Engineering Review, pp. 15-17, Apr. 2001.

Li et al., "Clean coal conversion process—progress and challenges", Energy & Environmental Science, vol. 1, pp. 248-267, Jul. 11, 2008.

Ockwig et al., "Membranes for Hydrogen Separation", American Chemical Society, Chem. Rev., vol. 107, pp. 4078-4110, Oct. 10, 2007.

European Search Report for Application No. 07716591.8 dated Mar. 6, 2012.

International Search Report and Written Opinion for International Application No. PCT/US2007/000956 dated Dec. 4, 2007.

International Preliminary Report on Patentability for International Application No. PCT/US2007/000956 dated Jul. 24, 2008.

International Search Report and Written Opinion for International Application No. PCT/US2009/058579 dated Aug. 3, 2010.

International Search Report and Written Opinion for International Application No. PCT/US2010/048121 dated Apr. 1, 2011.

International Preliminary Report on Patentability for International Application No. PCT/US2010/048121 dated Mar. 22, 2012.

International Search Report and Written Opinion for International Application No. PCT/US2011/059736 dated Mar. 27, 2012.

International Preliminary Report on Patentability for International Application No. PCT/US2011/059736 dated May 23, 2013.

(56) References Cited

OTHER PUBLICATIONS

International Search Report and Written Opinion for International Application No. PCT/US2012/37544 dated Aug. 10, 2012.
International Preliminary Report on Patentability for International Application No. PCT/US2012/037544 dated Nov. 12, 2013.
International Search Report and Written Opinion for International Application No. PCT/US2012/037557 dated Aug. 13, 2012.
International Preliminary Report on Patentability for International Application No. PCT/US2012/037557 dated Nov. 21, 2013.
Office Action pertaining to U.S. Appl. No. 12/160,803 dated Jun. 7, 2011.
Final Rejection pertaining to U.S. Appl. No. 12/160,803 dated Jan. 5, 2012.
Office Action pertaining to U.S. Appl. No. 12/160,803 dated Jun. 5, 2012.
Final Rejection pertaining to U.S. Appl. No. 12/160,803 dated Mar. 22, 2013.
Advisory Action pertaining to U.S. Appl. No. 12/160,803 dated Jul. 11, 2013.
Examiner's Answer before the Patent Trial and Appeal Board for U.S. Appl. No. 12/160,803 dated Nov. 4, 2013.
Office Action for Canadian Application No. 2636325 dated Dec. 5, 2012.
Office Action for Chinese Patent Application No. 200780006757.X dated Apr. 11, 2011.
Office Action for Chinese Patent Application No. 200780006757.X dated Dec. 8, 2011.
Office Action for Chinese Patent Application No. 200780006757.X dated Jul. 4, 2012.
Final Rejection for Chinese Patent Application No. 200780006757.X dated Feb. 1, 2013.
Office Action for Chinese Patent Application No. 201110226206.2 dated Sep. 5, 2012.
Office Action for Chinese Patent Application No. 201110226206.2 dated May 14, 2013.
Office Action for Chinese Patent Application No. 201110226206.2 dated Sep. 18, 2013.
Office Action pertaining to U.S. Appl. No. 13/121,009 dated Sep. 6, 2012.
Final Rejection pertaining to U.S. Appl. No. 13/121,009 dated Mar. 14, 2013.
Advisory Action pertaining to U.S. Appl. No. 13/121,009 dated Jun. 24, 2013.
Office Action pertaining to U.S. Appl. No. 13/121,009 dated Sep. 13, 2013.
Final Rejection pertaining to U.S. Appl. No. 13/121,009 dated Jan. 16, 2014.
Office Action for Taiwanese Patent Application No. 098132745 dated Aug. 7, 2013.
Office Action for Taiwanese Patent Application No. 098132745 dated Oct. 17, 2012.
Office Action for Chinese Patent Application No. 200980141285.8 dated Feb. 26, 2013.
Office Action for Chinese Patent Application No. 200980141285.8 dated Oct. 29, 2013.
Office Action for Chinese Patent Application No. 201080048173.0 dated Nov. 18, 2013.
Chinese Patent Office Action for Application No. 201280031083.X dated Feb. 24, 2016 (9 pages, English translation included).
International Search Report and Written Opinion for Application No. PCT/US14/14877 dated May 14, 2014 (10 pages).
International Search Report and Written Opinion for Application No. PCT/US14/25520 dated Jul. 11, 2014 (13 pages).
International Search Report and Written Opinion for Application No. PCT/US14/26071 dated Jul. 10, 2014 (9 pages).
International Search Report and Written Opinion for Application No. PCT/US2014/027839 dated Jul. 24, 2014 (9 pages).
International Search Report and Written Opinion for Application No. PCT/US2014/028217 dated Jul. 28, 2014 (8 pages).
International Search Report and Written Opinion for Application No. PCT/US2015/018123 dated May 8, 2015 (10 pages).
Chinese Patent Office Action for Application No. 201280031083.X dated Aug. 8, 2014 (12 pages—English translated included).
Chinese Patent Office Action for Application No. 201280031083.X dated Jun. 15, 2015 (10 pages, English translation included).
Chinese Patent Office Action for Application No. 201080048130.2 dated Jul. 24, 2014 (6 pages, English translation only).
Chinese Patent Office Action for Application No. 201080048130.2 dated Mar. 13, 2015 (4 pages, English translation only).
Chinese Patent Office Action for Application No. 201080048173.0 dated Sep. 2, 2014 (3 pages, English translation only).
Chinese Patent Office Action for Application No. 201080048173.0 dated Jan. 16, 2015 (14 pages, English translation included).
United States Patent Office Action for U.S. Appl. No. 13/394,572 dated Apr. 9, 2014 (26 pages).
United States Patent Office Action for U.S. Appl. No. 13/394,572 dated Aug. 26, 2014 (16 pages).
United States Patent Office Action for U.S. Appl. No. 13/394,572 dated Dec. 30, 2014 (19 pages).
United States Patent Office Action for U.S. Appl. No. 13/394,396 dated Dec. 18, 2014 (14 pages).
United States Patent Office Final Rejection for U.S. Appl. No. 13/394,396 dated Jul. 2, 2015 (15 pages).
United States Patent Office Action for U.S. Appl. No. 14/091,654 dated Oct. 30, 2014 (14 pages).
United States Patent Office Action for U.S. Appl. No. 14/091,654 dated Jun. 12, 2015 (16 pages).
United States Patent Office Notice of Allowance for U.S. Appl. No. 14/504,295 dated Sep. 28, 2015 (10 pages).
United States Patent Office Notice of Allowance for U.S. Appl. No. 13/394,572 dated Dec. 14, 2015 (10 pages).
United States Patent Office Action for U.S. Appl. No. 12/160,803 dated Feb. 23, 2016 (27 pages).
United States Patent Office Action for U.S. Appl. No. 13/394,396 dated Jan. 15, 2016 (13 pages).
United States Patent Office Action for U.S. Appl. No. 13/394,572 dated Oct. 13, 2015 (21 pages).
United States Patent Office Notice of Allowance for U.S. Appl. No. 13/394,572 dated Feb. 22, 2016 (8 pages).
United States Patent Office Action for U.S. Appl. No. 14/091,654 dated Jan. 4, 2016 (17 pages).
Abad et al., "Chemical-looping combustion in a 300 W continuously operating reactor system using a manganese-based oxygen carrier," Fuel, 2006, vol. 85, Issue 9, pp. 1174-1185.
Abad et al., "Reduction Kinetics of Cu-, Ni-, and Fe-Based Oxygen Carriers Using Syngas (CO + H2) for Chemical-Looping Combustion," Energy Fuels, 2007, 21 (4), pp. 1843-1853.
Abad et al., "The use of iron oxide as oxygen carrier in a chemical-looping reactor," Fuel, 2007, vol. 86, Issues 7-8, pp. 1021-1035.
Adanez et al., "Progress in Chemical-Looping Combustion and Reforming technologies," Progress in Energy and Combustion Science, 2012, vol. 38, Issue 2, pp. 215-282.
Azis et al., "On the evaluation of synthetic and natural ilmenite using syngas as fuel in chemical-looping combustion (CLC)," Chemical Engineering Research and Design, 2010, vol. 88, Issue 11, pp. 1505-1514.
Balasubramanian et al., "Hydrogen from methane in a single-step process," Chem Engr Science, 1999, 54(15-16), 3543.
Cao et al., "Investigation of Chemical Looping Combustion by Solid Fuels. 1. Process Analysis," Energy Fuels, 2006, 20(5), pp. 1836-1844.
De Diego et al., "Development of Cu-based oxygen carriers for chemical-looping combustion," Fuel, 2004, vol. 83, Issue 13, pp. 1749-1757.
Denton et al., "Simultaneous Production of High-Purity Hydrogen and Sequestration-Ready CO2 from Syngas," 2003.
Fan et al., "Chemical looping processes for CO2 capture and carbonaceous fuel conversion prospect and opportunity," Energy Environmental Science, 2012, p. 7254-7280.

(56) References Cited

OTHER PUBLICATIONS

Forero et al., "Syngas combustion in a 500 Wth Chemical-Looping Combustion system using an impregnated Cu-based oxygen carrier," Fuel Processing Technology, 2009, vol. 90, Issue 12, pp. 1471-1479.

Gao et al., "Production of syngas via autothermal reforming of methane in a fluidized-bed reactor over the combined $CeO_2$—$ZrO_2$/$SiO_2$ supported Ni catalysts," International Journal of Hydrogen Energy, 2008, vol. 33, p. 5493-5500.

Garcia-Labiano et al., "Temperature variations in the oxygen carrier particles during their reduction and oxidation in a chemical-looping combustion system," Chemical Engineering Science, 2005, vol. 60, No. 3, pp. 851-862.

Ghanapragasam et al., "Hydrogen production from coal direct chemical looping and syngas chemical looping combustion systems: Assessment of system operation and resource requirements," International Journal of Hydrogen Energy, 2009, vol. 34, Issue 6, pp. 2606-2615.

Go et al., "Hydrogen production from two-step steam methane reforming in a fluidized bed reactor," International Journal of Hydrogen Energy, 2009, vol. 34, p. 1301-1309.

Hua et al., "Three Dimensional Analysis of Electrical Capacitance Tomography Sensing Fields," 1999 IOP Publishing Ltd, vol. 10, pp. 717-725.

Johansson et al., "Combustion of Syngas and Natural Gas in a 300 W Chemical-Looping Combustor," Chemical Engineering Research and Design Volume, 2006, vol. 84, Issue 9, pp. 819-827.

Leion et al., "Solid fuels in chemical-looping combustion using oxide scale and unprocessed iron ore as oxygen carriers," Fuel, 2009, vol. 88, Issue 10, pp. 1945-1954.

Leion et al., "Solid fuels in chemical-looping combustion," International Journal of Greenhouse Gas Control, 2008, vol. 2, Issue 2, pp. 180-193.

Leion et al., "The use of petroleum coke as fuel in chemical-looping combustion," Fuel, 2007, vol. 86, Issue 12-13, pp. 1947-1958.

Li et al., "Role of Metal Oxide Support in Redox Reactions of Iron Oxide for Chemical Looping Applications: Experiments and Density Functional Theory Calculations," Energy Environmental Science, 2011, vol. 4, p. 3661-3667.

Li et al., "Syngas chemical looping gasification process: Bench-scale studies and reactor simulations," AICHE Journal, 2010, vol. 56, Issue 8, pp. 2186-2199.

Li et al., "Syngas Chemical Looping Gasification Process: Oxygen Carrier Particle Selection and Performance," Energy Fuels, 2009, 23(8), pp. 4182-4189.

Lyngfelt, "Chemical Looping Combustion of Solid Fuels—Status of Development," Applied Energy, 2014, vol. 113, p. 1869-1873.

Lyngfelt, "Oxygen Carriers for Chemical Looping Combustion Operational Experience," 1st International Conference on Chemical Looping, Mar. 2010.

Mamman et al., "Simultaneous steam and CO2 reforming of methane to syngas over NiO/MgO/SA-5205 in presence and absence of oxygen," Applied Catalysis A, 1998, vol. 168, p. 33-46.

Marashdeh, Q. et al., "A Multimodal Tomography System Based on ECT Sensors," IEEE Sensors Journal, vol. 7, No. 3, 2007, 426-433.

Marashdeh, Q., Advances in Electrical Capacitance Tomography, Dissertation, The Ohio State University, 2006.

Mattisson et al., "Chemical-looping combustion using syngas as fuel," International Journal of Greenhouse Gas control, 2007, vol. 1, Issue 2, pp. 158-169.

Mattisson et al., "CO 2 capture from coal combustion using chemical-looping combustion—Reactivity investigation of Fe, Ni and Mn based oxygen carriers using syngas," Department of Energy and Environment, Division of Energy Technology and Department of Chemical and Biological Engineering, Division of Environmental Inorganic Chemistry, Chalmers University of Technology, 2007.

Ortiz et al., "Hydrogen Production by Auto-Thermal Chemical-Looping Reforming in a Pressurized Fluidized Bed Reactor Using Ni-based Oxygen Carriers," International Journal of Hydrogen Energy, 2010, vol. 35, p. 151-160.

Pröll et al., "Syngas and a separate nitrogen/argon stream via chemical looping reforming—A 140 kW pilot plant study," Fuel, 2010, vol. 89, Issue 6, pp. 1249-1256.

Ruchenstein et al., "Carbon dioxide reforming of methane over nickel/alkaline earth metal oxide catalysts," Applied Catalysis A, 1995, vol. 133, p. 149-161.

Ryden et al., "Synthesis gas generation by chemical-looping reforming in a continuously operating laboratory reactor," Fuel, 2006, vol. 85, p. 1631-1641.

Scott et al., "In situ gasification of a solid fuel and CO2 separation using chemical looping," AICHE Journal, 2006, vol. 52, Issue 9, pp. 3325-3328.

Shen et al., "Experiments on chemical looping combustion of coal with a NiO based oxygen carrier," Combustion and Flame, 2009, vol. 156, Issue 3, pp. 721-728.

Sridhar et al., "Syngas Chemical Looping Process: Design and Construction of a 25 kWth Subpilot Unit," Energy Fuels, 2012, 26(4), pp. 2292-2302.

Tian et al., "Thermodynamic investigation into carbon deposition and sulfur evolution in a Ca-based chemical-looping combustion system," Chemical Engineering Research & Design, 2011, vol. 89, Issue 9, p. 1524.

Usachev et al., "Conversion of Hydrocarbons to Synthesis Gas: Problems and Prospects," Petroleum Chemistry, 2011, vol. 51, p. 96-106.

Warsito, W. et al., Electrical Capacitance Volume Tomography, 2007, pp. 1-9.

Yamazaki et al., "Development of highly stable nickel catalyst for methane-steam reaction under low steam to carbon ratio," Applied Catalyst A, 1996, vol. 136, p. 49-56.

Zafar et al., "Integrated Hydrogen and Power Production with CO2 Capture Using Chemical-Looping ReformingRedox Reactivity of Particles of CuO, Mn2O3, NiO, and Fe2O3 Using SiO2 as a Support," Ind. Eng. Chem. Res., 2005, 44(10), pp. 3485-3496.

Annual Project Report as of Dec. 2001.

Cho et al., "Comparison of iron-, nickel, copper- and manganese-based oxygen carriers for chemical-looping combustion", Fuel, vol. 83, pp. 1215-1225, 2004.

U.S. Department of Energy, NCCTI Energy Technologies Group, Office of Fossil Energy, "CO2 Capture and Storage in Geologic Formations", pp. 34, Revised Jan. 8, 2002.

Environmental Protection Agency, "Geological CO2 Sequestration Technology and Cost Analysis", Technical Support Document, pp. i-vi & pp. 1-61, Jun. 2008.

Geldart, "Types of Gas Fluidization", Powder Technology, vol. 7, pp. 285-292, 1973.

Haque, "Microwave energy for mineral treatment processes—a brief review", International Journal of Mineral Processing, vol. 57, pp. 1-24, 1999.

Hawley's Condensed Chemical Dictionary, entry for "ammonium bisulfate", John Wiley & Sons, Inc. 2002.

Hossain et al., "Chemical-looping combusion (CLC) for inherent CO2 separations—a review", Chemical Engineering Science, vol. 63, pp. 4433-4451; 2008.

Jin et al., "Development of a Novel Chemical-Looping Combustion: Synthesis of a Looping Material with a Double Metal Oxide of CoO—NiO", Energy & Fuels, vol. 12, pp. 1272-1277, 1998.

Huijgen et al., "Carbon dioxide sequestration by mineral carbonation", ECN-C—03-016, www.ecn.nl/docs/library/report/200e/c03016.pdf, Feb. 2003.

Jadhav et al., "Carbonation of Mg-Bearing Minerals: Kinetic and Mechanistic Studies", Ohio Coal Research Consortium/Ohio State University Project C3.12, www.ohiocoal.org/projects/year3/c3.12, Jul. 3, 2002.

Li et at., "Clean coal conversion processes—progress and challenges", The Royal Society of Chemistry, Energy & Environmental Science, vol. 1, pp. 248-267, Jul. 30, 2008.

Mattisson et al., "Applications of chemical-looping combustion with capture of CO2", Second Nordic Minisymposium on Carbon Dioxide Capture and Storate, Goeteborg, pp. 46-51, Oct. 26, 2001.

(56) References Cited

OTHER PUBLICATIONS

Mattisson et al., "Reactivity of Some Metal Oxides Supported on Alumina with Alternating Methane and Oxygen—Application for Chemical-Looping Combustion", energy & Fuels, vol. 17, pp. 643-651, 2003.
Mattisson et al., "The use of iron oxide as an oxygen carrier in chemical-looping combustion of methane with inherent separation of CO2", Fuel, vol. 80, pp. 1953-1962, 2001.
Mattisson et al., "Use of Ores and Industrial Products As Oxygen Carriers in Chemical-Looping Combustion", Energy & Fuels, vol. 23, pp. 2307-2315, 2009.
O'Connor et al., "Carbon Dioxide Sequestration by Direct Mineral Carbonation: Results from Recent Studies and Current Status", Abstract, USDOE Office of Fossil Energy, 2001.
Park et al., "CO2 Mineral Sequestration: Chemically Enhanced Aqueous Carbonation of Serpentine", The Canadian Journal of Chemical Engineering, vol. 81, pp. 885-890, Jun.-Aug. 2003.
Park et al., "CO2 Mineral Sequestration: physically activated dissolution of serpentine and pH swing process", Chemical Engineering Science, vol. 59, pp. 5241-5247, 2004.
Russo et al., "Impact of Process Design of on the Multiplicity Behavior of a Jacketed Exothermic CSTR", AIChE Journal, vol. 41, No. 1, pp. 135-147, Jan. 1995.
Shen et al, "Chemical-Looping Combustion of Biomass in a 10 kWth Reactor with Iron Oxide as an Oxygen Carrier", Energy & Fuels, vol. 23, pp. 2498-2505, 2009.
Steinfeld et al., "Design Aspects of Solar Thermochemical Engineering—A Case Study: Two-Step Water-Splitting Cycle Using the Fe3O4/FeO Redox System" Solar Energy, vol. 65, No. 1, pp. 43-53, 1999.
Steinfeld, "Solar hydrogen production via a two-step water-splitting thermochemical cycle based on Zn/ZnO redox reactions", International Journal of Hydrogen Energy, vol. 27, pp. 611-619, 2002.
Vernon et al., "Partial Oxidation of Methane to Synthesis Gas", Catalysis Letters, vol. 6, pp. 181-186, 1990.
International Search Report and Written Opinion for International Application PCT/US2010/048125 dated Dec. 17, 2010.
International Preliminary Report on Patentability for International Application PCT/US2010/048125 dated Mar. 22, 2012.
Office Action for Chinese Patent Application No. 201080048130.2 dated Nov. 13, 2013.
Herzog, "Carbon Sequestration via Mineral Carbonation: Overview and Assessment", MIT Laboratory for Energy and the Environment, http://sequestration.mit.edu/pdf/carbonates.pdf, Mar. 14, 2002.
Ohio Coal Development Office of the Ohio Air Quality Development Authority, "Ohio Coal Research Consortium (OCRC)—IV, Year 3 Proposals Solicitation", http://www.ohioairquality.org/ocdo/other_pdf/Consortium_IV_Year_3_RFP.pdf.
Adanez et al., "Selection of oxygen carriers for chemical-looping combustion," Energy & Fuels, American Chemical Society, 2004, vol. 18, No. 2, pp. 371-377.
European Patent Office Action for Application No. 12782631.1 dated Nov. 23, 2015 (8 pages).
United States Patent Office Action for U.S. Appl. No. 15/162,199 dated Jun. 30, 2016 (10 pages).
United States Patent Office Final Rejection for U.S. Appl. No. 15/162,199 dated Oct. 21, 2016 (9 pages).
United States Patent Office Notice of Allowance for U.S. Appl. No. 13/394,396 dated Aug. 3, 2016 (8 pages).
United States Patent Office Action for U.S. Appl. No. 14/116,627 dated Oct. 20, 2016 (6 Pages).
United States Patent Office Notice of Allowance for U.S. Appl. No. 14/116,627 dated Mar. 10, 2017 (5 pages).
United States Patent Office Action for U.S. Appl. No. 14/634,319 dated Nov. 7, 2016 (7 pages).
United States Patent Office Notice of Allowance for U.S. Appl. No. 14/774,730 dated Nov. 16, 2016 (10 pages).
United States Patent Office Action for U.S. Appl. No. 14/766,086 dated Jan. 13, 2017 (22 pages).
United States Patent Office Action for U.S. Appl. No. 14/634,319 dated Apr. 11, 2017 (9 pages).
United States Patent Office Action for U.S. Appl. No. 13/883,795 dated Jun. 20, 2016 (15 pages).
Australian Patent Examination Report No. 1 for Application No. 2012253328 dated May 6, 2016 (3 pages).
Bell et al., "H2 Production via Ammonia Decomposition Using Non-Noble Metal Catalysts: A Review," Top Catal, 2016, 59, 1438-1457.
Cheng et al., "Carbon Dioxide Adsorption and Activation on Ceria (110)," J. Chem. Phys. 2013, 138, 014702.
Cheng et al., "Methane Adsorption and Dissociation on Iron Oxide Oxygen Carrier: Role of Oxygen Vacancy," Phys. Chem. Chem. Phys. 2016, 18, 16423-16435.
Cheng et al., "Propagation of Olefin Metathesis to Propene on WO3 Catalysts: A Mechanistic and Kinetic Study," ACS Catal. 2015, 5, 59-72.
Connell et al., "Process Simulation of Iron-Based Chemical Looping Schemes with CO2 Capture for Hydrogen and Electricity Production from Coal," Presented at 29th Annual International Pittsburgh Coal Conference, Pittsburgh, PA, Oct. 15-18, 2012, pp. 1274-1281.
De Klerk, "Gas-to-Liquid Conversion." Natural Gas Conversion Technologies Workshop of ARPA-E. U.S. Department of Energy, Houston, TX. vol. 13 (2012).
EIA—Independent Statistics and Analysis. U.S. Department of Energy, U.S. Energy Information Administration "Annual Energy Outlook 2015 with Projections to 2040," Apr. 2015.
EIA—Independent Statistics and Analysis. U.S. Department of Energy, U.S. Energy Information Administration, "How Much Petroleum Does the United States Import and from Where?" <https://www.eia.gov/tools/faqs/faq.php?id=727&t=6> webpage available as early as Mar. 22, 2017.
EIA—Independent Statistics and Analysis. U.S. Department of Energy, U.S. Energy Information Administration, "Natural Gas Vented and Flared." <https://www.eia.gov/dnav/ng/NG_PROD_SUM_A_EPG0_VGV_MMCF_A.htm> webpage available as early as Feb. 29, 2016.
EIA—Independent Statistics and Analysis. U.S. Department of Energy, U.S. Energy Information Administration, "Natural Gas Weekly Update." <https://www.eia.gov/naturalgas/weekly/> webpage available as early as Dec. 4, 2011.
Fan et al., "Chemical-Looping Technology Platform," AIChE Journal, 61(1), 2-22 (2015).
Fan, "Chemical Looping Systems for Fossil Energy Conversions," Wiley-AIChE: Hoboken, NJ, U.S.A.; 2010.
Ishida et al., "Evaluation of a Chemical-Looping-Combustion Power-Generation System by Graphic Exergy Analysis," Energy, 12(2), 147-154 (1987).
Kathe et al., "Chemical Looping Gasification for Hydrogen Enhanced Syngas Production with in-situ CO2 Capture," United States Department of Energy, OSTI: 1185194, (2015).
Li et al., "Ionic Diffusion in the Oxidation of Iron-effect of Support and Its Implications to Chemical Looping Applications," Energy Environ. Sci. 2011, 4, 876-880.
Liu et al., "Enhanced Performance of Alkali Metal Doped Fe2O3 and Fe2O3/Al2O3 Composites as Oxygen Carrier Material in Chemical Looping Combustion," Energy Fuels. 2013, 27, 4977-4983.
Luo et al., "Shale Gas-to-Syngas Chemical Looping Process for Stable Shale Gas Conversion to High Purity Syngas with H2:CO Ratio of 2:1," Energy and Environmental Science, 7(12), 4104-4117, (2014).
Makepeace et. al., "Ammonia decomposition catalysis using non-stoichiometric lithium imide," Chem. Sci., 2015, 6, 3805.
Miller et al., "Toward Transformational Carbon Capture," AIChE Journal, 62, 1-10 (2016).
NETL, National Energy Technology Laboratory. U.S. Department of Energy, "Quality Guidelines for Energy System Studies—Specification for Selected Feedstocks." Jan. 2012.
Qin et al., "Evolution of Nanoscale Morphology in Single and Binary Metal Oxide Microparticles During Reduction and Oxidation Processes," J. Mater. Chem. A. 2014, 2, 17511-17520.

(56) References Cited

OTHER PUBLICATIONS

Qin et al., "Impact of 1% Lathanum Dopant on Carbonaceous Fuel Redox Reactions with an Iron-Based Oxygen Carrier in Chemical Looping Processes," ACS Energy Letters, 2017, 2, 70-74.

Qin et al., "Nanostructure Formation Mechanism and Ion Diffusion in Iron-Titanium Composite Materials with Chemical Looping Redox Reactions," J. Mater. Chem. A. 2015, 3, 11302-11312.

Quin et al., "Improved Cyclic redox reactivity of lanthanum modified iron-based oxygen carriers in carbon monoxide xhemical looping combustion," Journal of Materials Chemistry A, 2017, 8 pages.

Yin et. al., "A mini-review on ammonia decomposition catalysts for on-site generation of hydrogen for fuel cell applications," Applied Catalysis A: General, 2004, 277, 1-9.

International Search Report and Written Opinion for Application No. PCT/US2017/027241 dated Jul. 10, 2017 (11 pages).

International Search Report and Written Opinion for Application No. PCT/US2017/034503 dated Aug. 15, 2017 (14 pages).

United States Patent Office Action for U.S. Appl. No. 13/883,795 dated Jun. 23, 2017 (11 pages).

United States Patent Office Notice of Allowance for U.S. Appl. No. 14/116,627 dated Jun. 14, 2017 (5 pages).

United States Patent Office Action for U.S. Appl. No. 14/775,044 dated May 30, 2017 (15 pages).

Velazquez-Vargas et al., "Atmospheric Iron-based Coal Direct Chemical Looping (CDCL) Process for Power Generation", presented in Power-Gen International 2012, Orlando, FL, Dec. 11-13, 2012, BR-1892, 1-5.

United States Patent Office Action for U.S. Appl. No. 14/766,086 dated Sep. 7, 2017 (19 pages).

United States Patent Office Action for U.S. Appl. No. 14/774,727 dated Sep. 14, 2017 (10 pages).

United States Patent Office Action for U.S. Appl. No. 14/766,086 dated Jan. 2, 2018 (21 pages).

United States Patent Office Action for U.S. Appl. No. 15/191,249 dated Dec. 28, 2017 (14 pages).

\* cited by examiner

SYSTEMS FOR CONVERTING FUEL

This application claims benefit to U.S. Provisional Application Ser. No. 61/485,010, filed May 11, 2011, which is incorporated by reference herein in its entirety.

FIELD

The present invention is generally directed to systems and methods of converting fuel, and is specifically directed to oxidation-reduction reactor systems used in fuel conversion.

TECHNICAL BACKGROUND

There is a constant need for clean and efficient energy generation systems. Most of the commercial processes that generate energy carriers such as steam, hydrogen, synthesis gas (syngas), liquid fuels and/or electricity are based on fossil fuels. Furthermore, the dependence on fossil fuels is expected to continue in the foreseeable future due to the much lower costs compared to renewable sources. Currently, the conversion of carbonaceous fuels such as coal, natural gas, petroleum coke is usually conducted through a combustion or reforming process. However, combustion of carbonaceous fuels, especially coal, is a carbon intensive process that emits large quantities of carbon dioxide to the environment. Sulfur and nitrogen compounds are also generated in this process due to the complex content in coal.

Chemical reactions between metal oxides and carbonaceous fuels, on the other hand, may provide a better way to recover the energy stored in the fuels. Several processes are based on the reaction of metal oxide particles with carbonaceous fuels to produce useful energy carriers. For example, Ishida et al. U.S. Pat. No. 5,447,024 describes processes wherein nickel oxide particles are used to convert natural gas through a chemical looping process into heat, which may be used in a turbine. However, recyclability of pure metal oxides is poor and constitutes an impediment for its use in commercial and industrial processes. Moreover, this technology has limited applicability, because it may only convert natural gas, which is more costly than other fossil fuels. Another well known process is a steam-iron process, wherein coal derived producer gas is reacted with iron oxide particles in a fluidized bed reactor to be later regenerated with steam to produce hydrogen gas. This process however suffers from poor gas conversion rates due to improper contact between reacting solids and gases, and is incapable of producing a hydrogen rich stream.

As demands increase for cleaner and more efficient systems of converting fuel, the need arises for improved systems, and system components therein, which will convert fuel effectively, while reducing pollutants.

The concepts of the present disclosure are generally applicable to systems for producing hydrogen from coal, or other carbonaceous fuels. In accordance with one embodiment of the present disclosure, a system for converting fuel may comprise a first moving bed reactor, a second reactor, and a non-mechanical valve. The first moving bed reactor may comprise at least one tapered section and multiple injection gas ports. The multiple injection gas ports may be configured to deliver a fuel to the first moving bed reactor. The first moving bed reactor may be configured to reduce an oxygen carrying material with a fuel by defining a counter-current flowpath for the fuel relative to the oxygen carrying material. The second reactor may communicate with the first moving bed reactor and may be operable to receive an oxygen source. The second reactor may be configured to regenerate the reduced oxygen carrying material by oxidation. The non-mechanical valve may comprise a circuitous piping assembly disposed between the first moving bed reactor and the second reactor. At least one gas opening may be configured to receive a gas stream. The gas stream may be operable to reduce gas leakage between the first moving bed reactor and the second reactor.

The following detailed description of specific embodiments of the present disclosure may be best understood when read in conjunction with the following drawings, where like structure is indicated with like reference numerals and in which.

Figure 10:
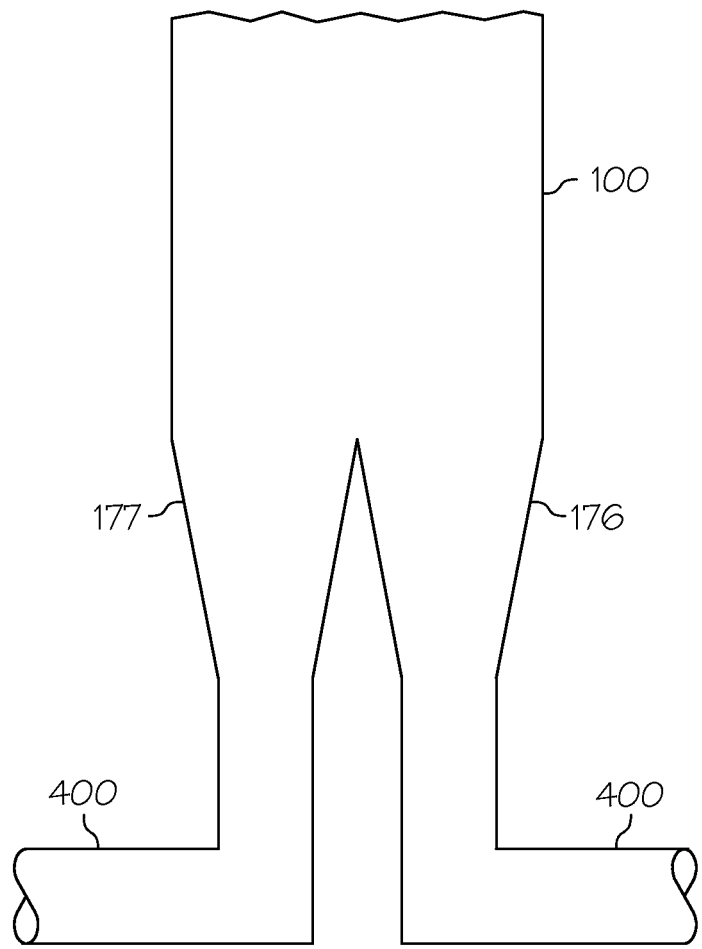
Figure 11:
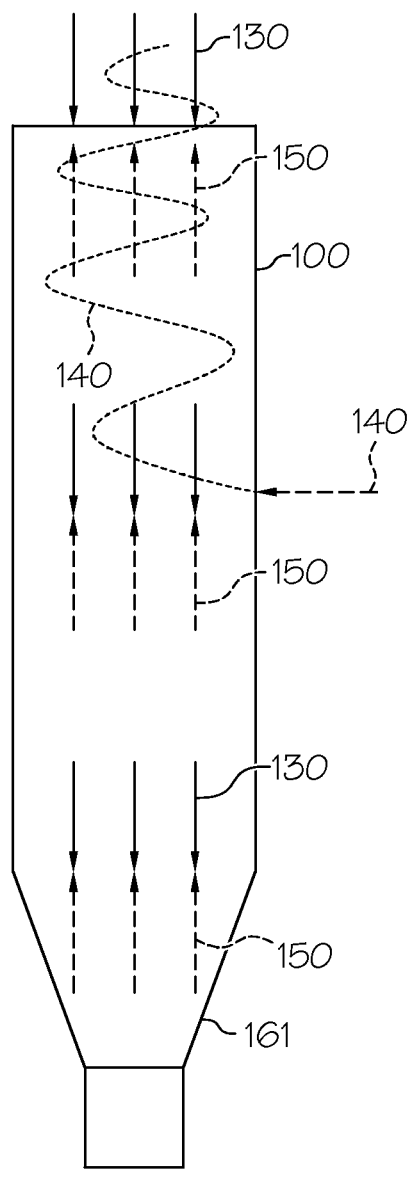
Figure 12:
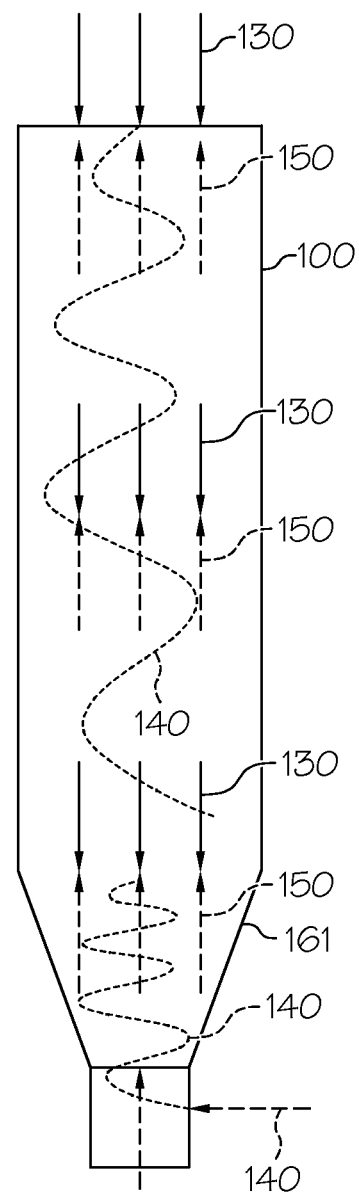
Figure 13:
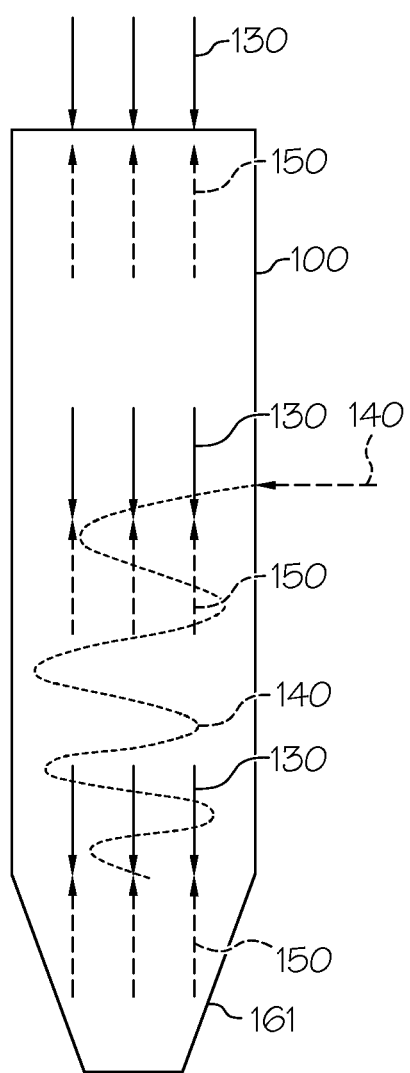
Figure 14:
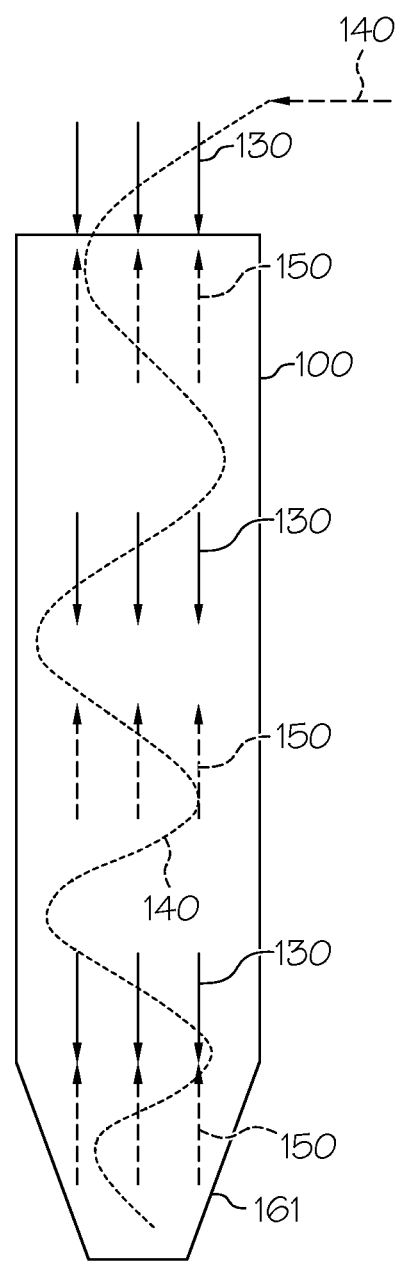
Figure 15:
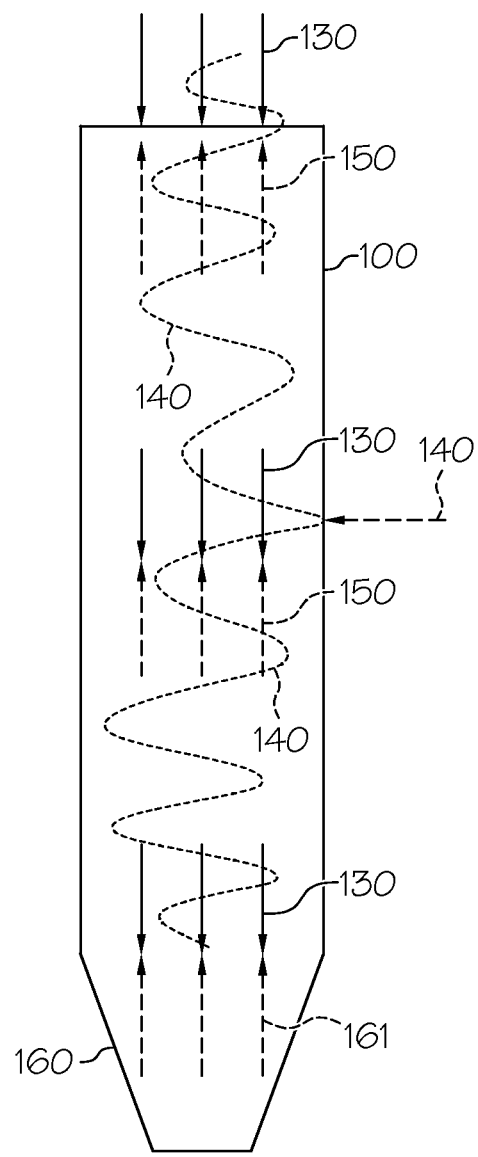
Figure 16A:
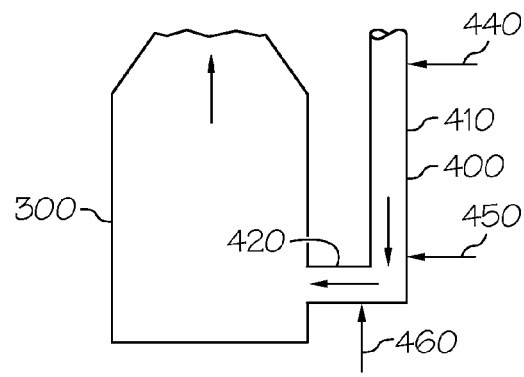
Figure 16B:
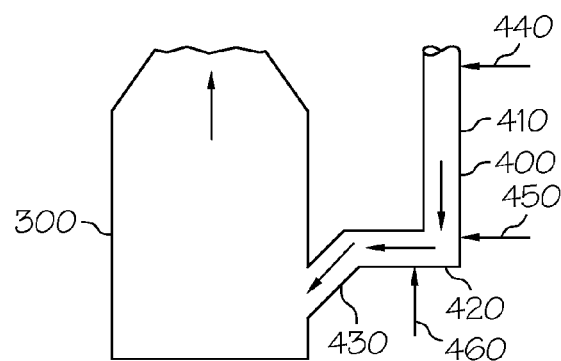
Figure 16C:
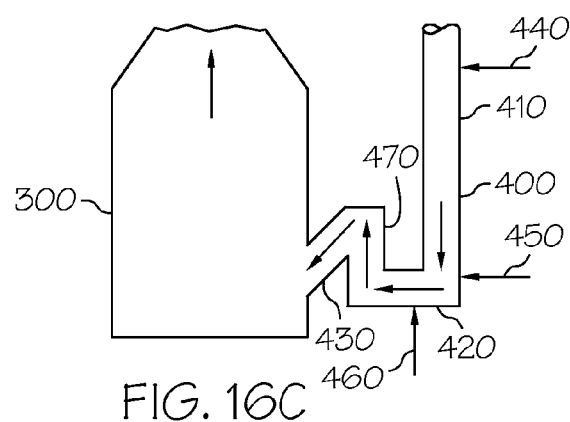
Figure 16D:
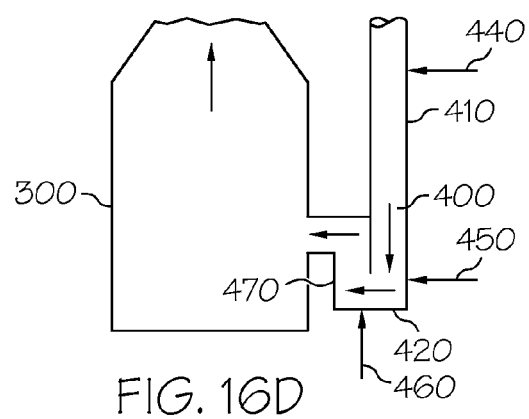
Figure 17:
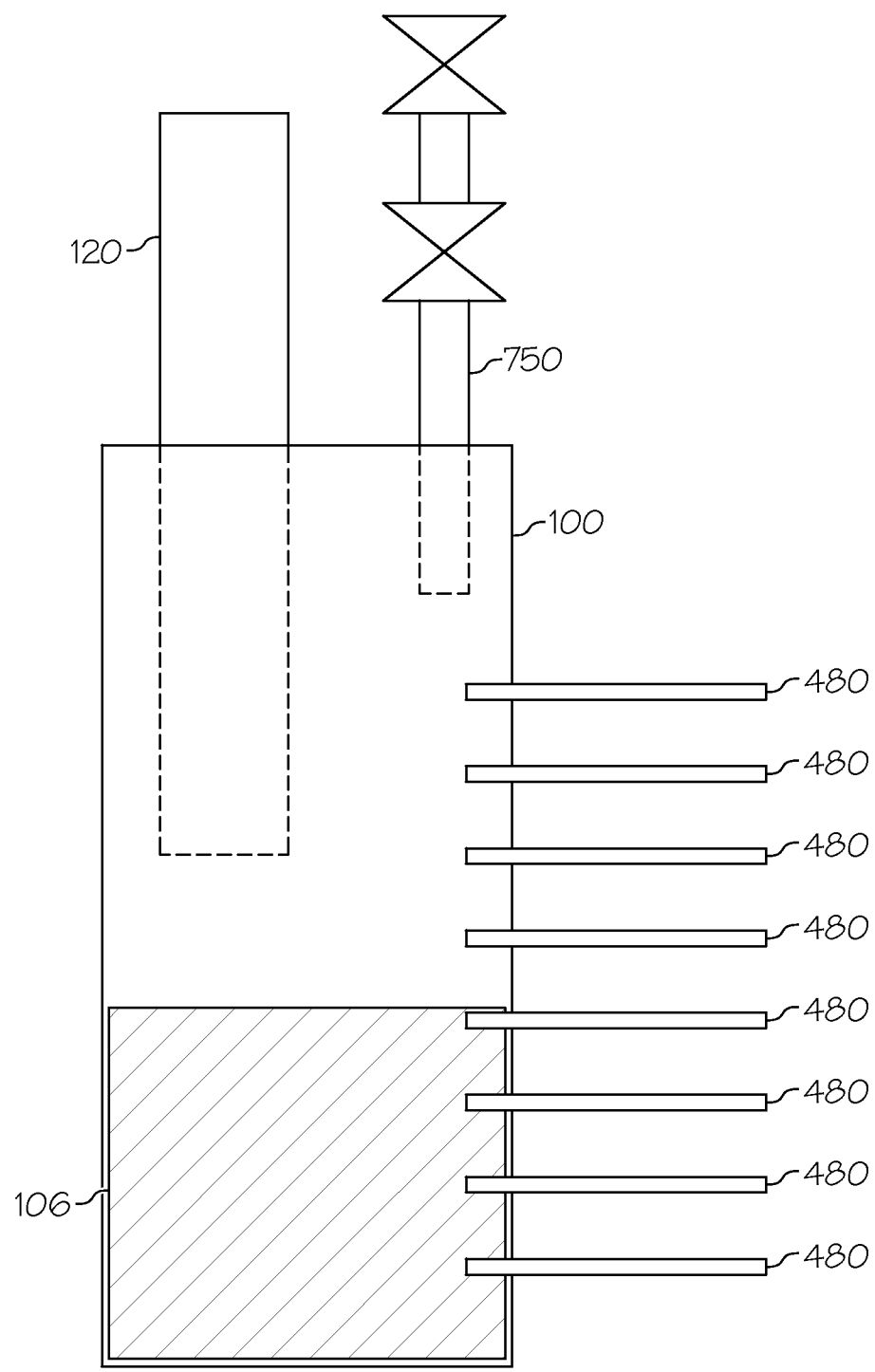
Figure 18:
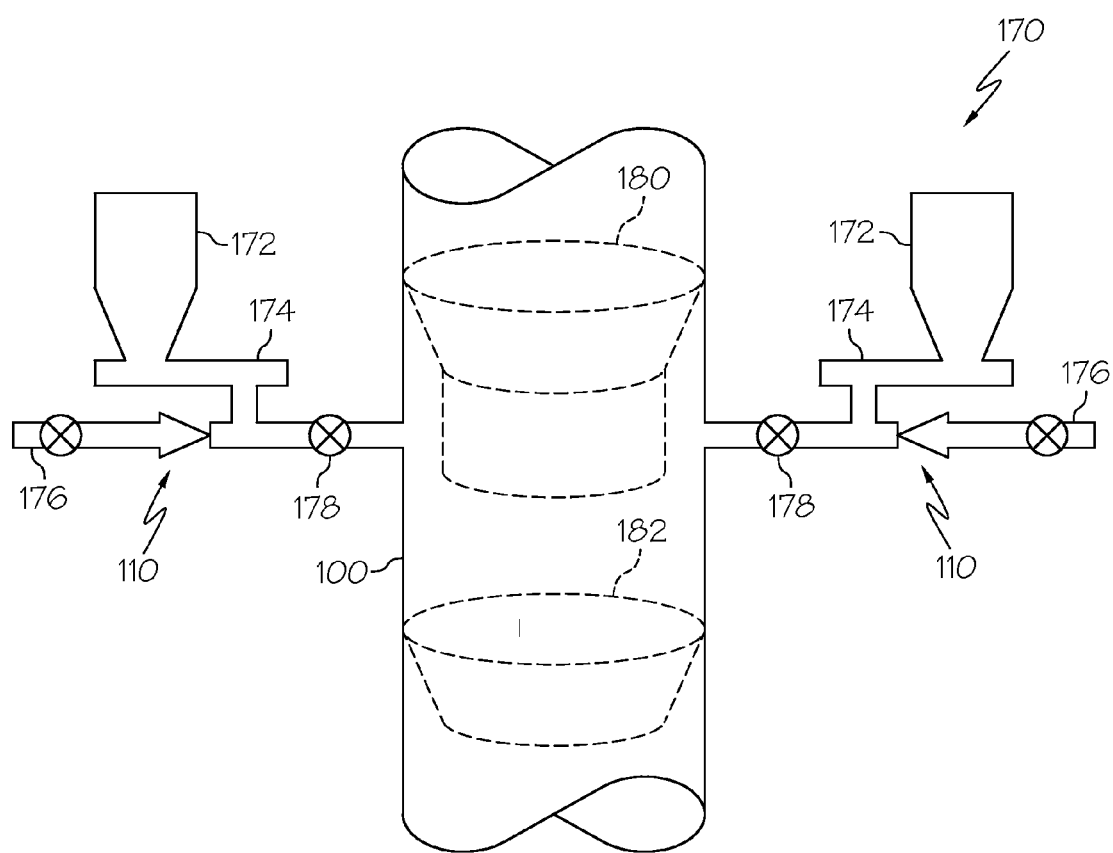
Figure 19:
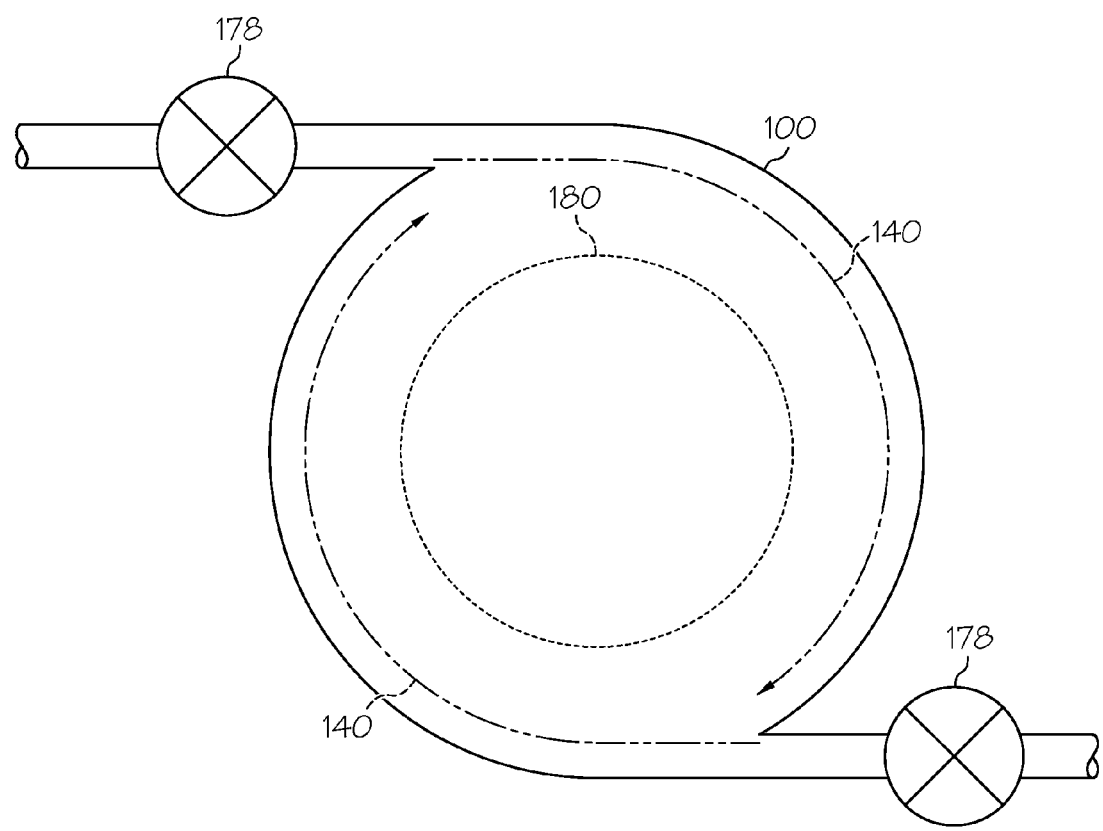
Figure 20A:
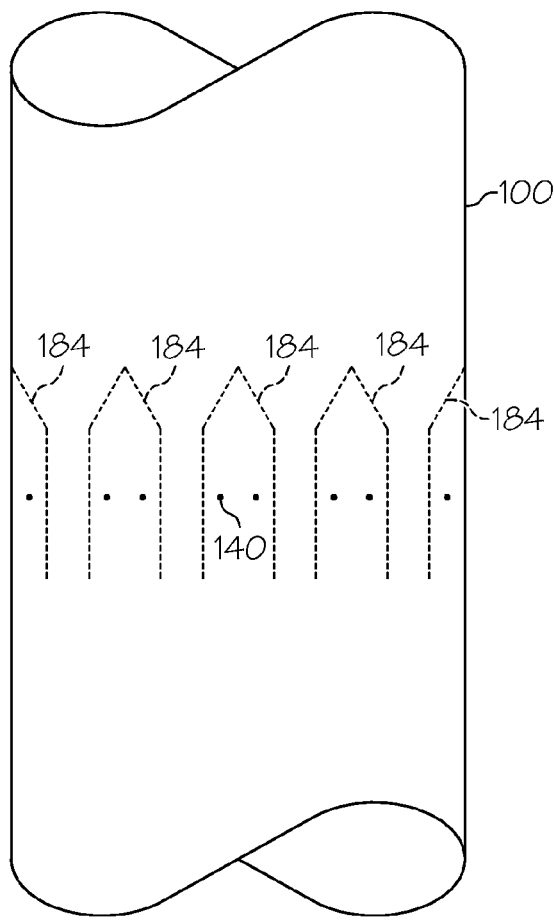
Figure 20B:
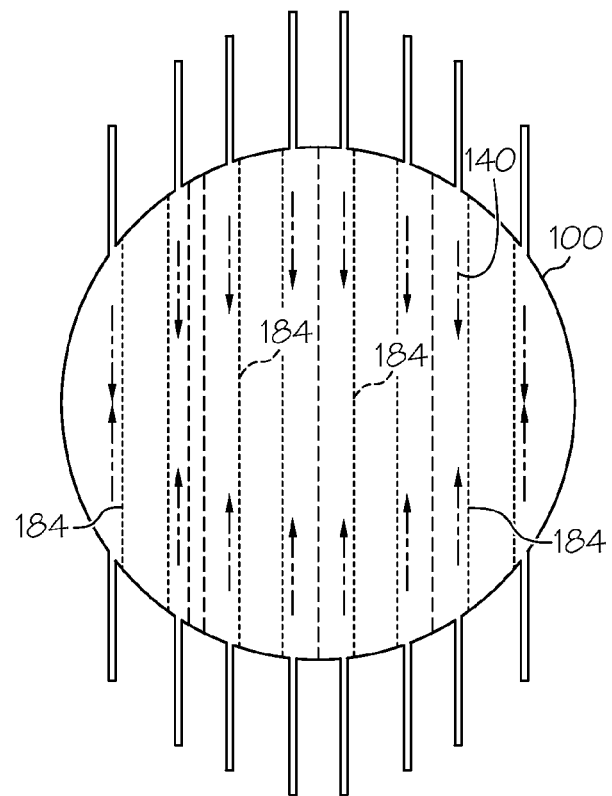
Figure 21:
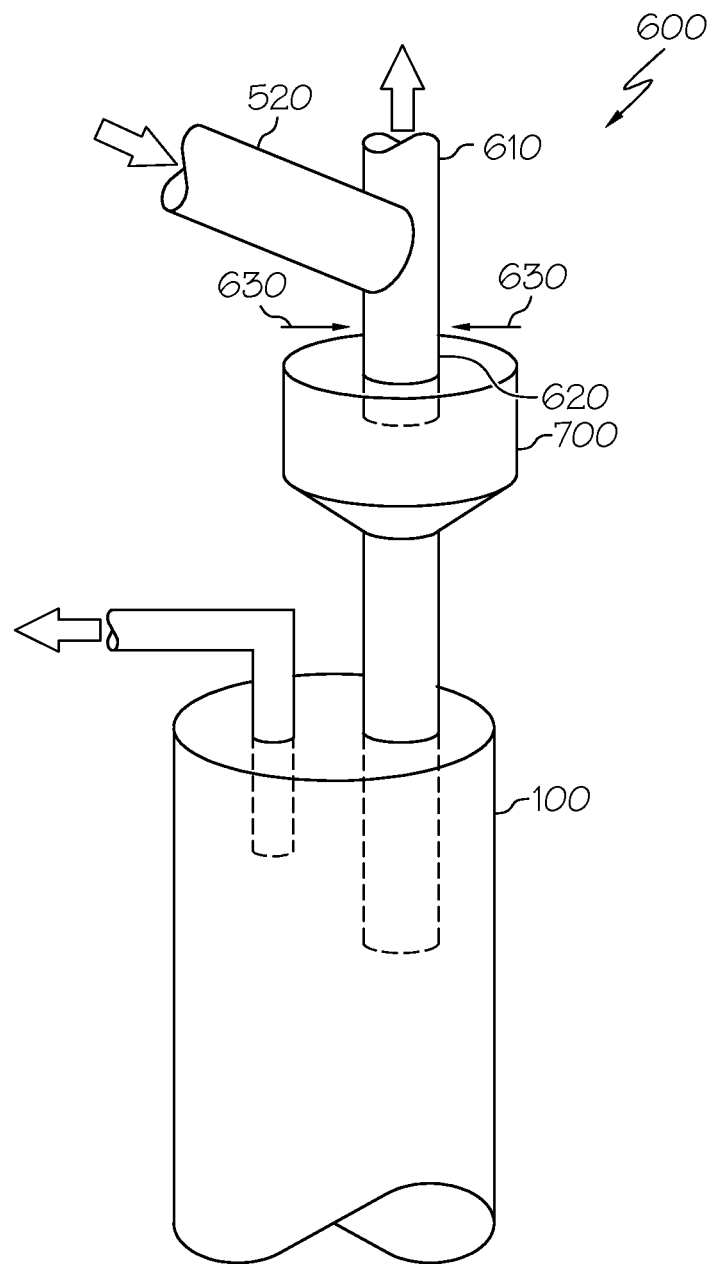
Figure 22A:
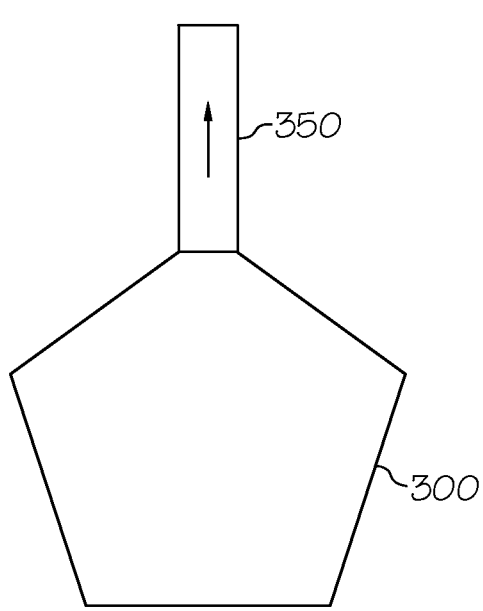
Figure 22B:
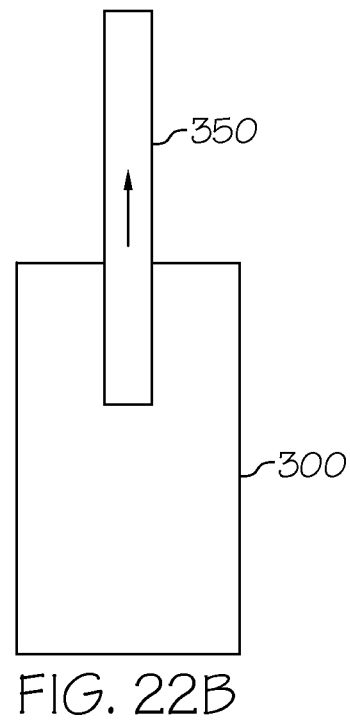
Figure 22C:
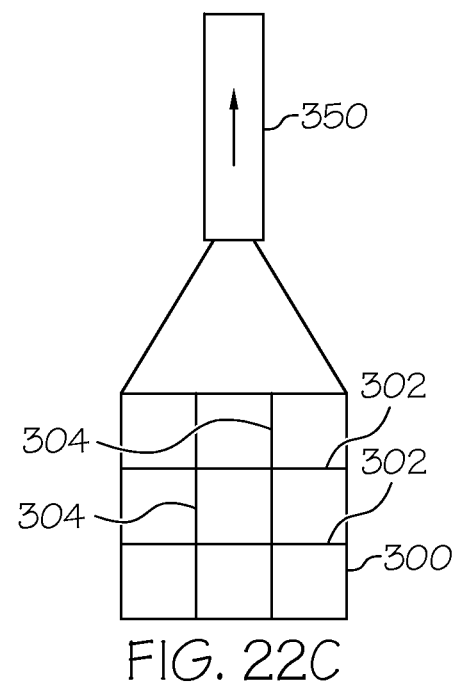

FIG. 10 side-view schematic illustration of another reduction reactor of a system for converting fuel according to one or more embodiments of the present invention;

FIG. 11 is a cross-section schematic illustration of a reduction reactor of a system for converting fuel according to one or more embodiments of the present invention;

FIG. 12 is a cross-section schematic illustration of another reduction reactor of a system for converting fuel according to one or more embodiments of the present invention;

FIG. 13 is a cross-section schematic illustration of another reduction reactor of a system for converting fuel according to one or more embodiments of the present invention;

FIG. 14 is a cross-section schematic illustration of another reduction reactor of a system for converting fuel according to one or more embodiments of the present invention;

FIG. 15 is a cross-section schematic illustration of another reduction reactor of a system for converting fuel according to one or more embodiments of the present invention;

FIG. 16A is a cross-section schematic illustration of a combustion reactor and combustion reactor inlet stream of a system for converting fuel according to one or more embodiments of the present invention;

FIG. 16B is a cross-section schematic illustration of another combustion reactor and combustion reactor inlet stream of a system for converting fuel according to one or more embodiments of the present invention;

FIG. 16C is a cross-section schematic illustration of another combustion reactor and combustion reactor inlet stream of a system for converting fuel according to one or more embodiments of the present invention;

FIG. 16D is a cross-section schematic illustration of another combustion reactor and combustion reactor inlet stream of a system for converting fuel according to one or more embodiments of the present invention;

FIG. 17 is a cross-section schematic illustration of a solids flow measurement device installed onto a reduction reactor;

FIG. 18 is side-view cross-sectional schematic illustration of a fuel injection system of a system for converting fuel according to one or more embodiments of the present invention;

FIG. 19 is top-view cross-sectional schematic illustration of a fuel injection system of a system for converting fuel according to one or more embodiments of the present invention;

FIG. 20A is side-view schematic illustration of a fuel injection system of a system for converting fuel according to one or more embodiments of the present invention;

FIG. 20B is top-view cross-sectional schematic illustration of a fuel injection system of a system for converting fuel according to one or more embodiments of the present invention;

FIG. 21 is a side-view schematic illustration of a solids separation unit of a system for converting fuel according to one or more embodiments of the present invention;

FIG. 22A is a cross-section schematic illustration of a combustion reactor according to one or more embodiments of the present invention;

FIG. 22B is a cross-section schematic illustration of another combustion reactor according to one or more embodiments of the present invention; and FIG. 22C is a cross-section schematic illustration of another combustion reactor according to one or more embodiments of the present invention.

The present invention is generally directed to the components of a system for the conversion of solid carbonaceous fuels into other forms of energy. Other configurations of the present invention may also be applied to convert liquid and gaseous fuels. The conversion of fuels may generally be performed with a binary mixture of particles in a system, wherein the binary mixture may comprise an oxygen carrying material and a solid carbonaceous fuel. In one embodiment, oxygen present in the oxygen carrying material oxidizes the solid fuels, while the oxygen carrying material particles are reduced to a lower oxidation state. Generally, the products of the system may include heat, power, chemicals, liquid fuels and/or $H_2$, which may be generated by re-oxidizing the reduced oxygen carrying material particles using oxidizing agents such as, but not limited to, air and/or steam in a separate reactor. In some embodiments, chemicals and liquid fuels may be produced using $H_2$ and/or $CO_2$ produced by the system, or through partial oxidation of metal oxide particles and coupling of the carbonaceous fuels.

In some embodiments, the systems described herein may involve circulation of primary metal oxide particles in a circulating fluidized bed with a downcomer of either a packed moving bed or a series of interconnected-fluidized beds, in which the solid fuels are injected and dispersed throughout the primary particles for the chemical reaction with primary oxygen carrying material particles. Generally, the metal oxides with coarse particle size may be used in the packed moving bed as the oxygen carrying material to avoid fluidization, whereas the solid fuel particle size is smaller than metal oxides, in order to extend the hydrodynamic limit of moving bed operation. The systems described herein also may utilize the difference of hydrodynamic properties of two types of particles to control their interaction and to separate the byproducts of solid fuels or unconverted solid fuels from the oxygen carrying material particles and gas products. Various application schemes using the oxygen carrying material circulating systems are explained herein. In addition, various reactor designs and details regarding the solid fuel handling and processing strategy in the chemical looping system are explained herein.

Methods for producing hydrogen gas by the use of a chemical looping process in an oxidation and reduction reaction scheme with carbon-based reducing fuels and oxidizing gases are disclosed in Thomas et al. (U.S. Pat. No. 7,767,191), Fan et al. (PCT Application No. WO 2007/082089), and Fan et al. (U.S. Provisional Application No. WO 2010/037011) respectively, and their teachings are incorporated herein in their entirety by reference.

Generally, the present invention is directed to systems and methods for converting fuel by redox reactions of oxygen carrying material particles. In some embodiments, reactor system may utilize a chemical looping process wherein carbonaceous fuels may be converted to heat, power, chemicals, liquid fuels, and/or hydrogen ($H_2$). In the process of converting carbonaceous fuels, oxygen carrying materials within the system such as oxygen carrying particles may undergo reduction/oxidation cycles. The carbonaceous fuels may reduce the oxygen carrying materials in a reduction reactor. The reduced oxygen carrying materials may then be oxidized by steam and/or air in one or more separate reactors. In some embodiments, oxides of iron may be preferred as at least one of the components in the oxygen carrying material in the chemical looping system. In some embodiments, oxides of copper, cobalt and manganese may also be utilized in the system. Oxygen carrying materials are described in Thomas et al. (U.S. Published App. No. 2005/0175533 A1), which is incorporated herein in its entirety by reference.

Figure 1:
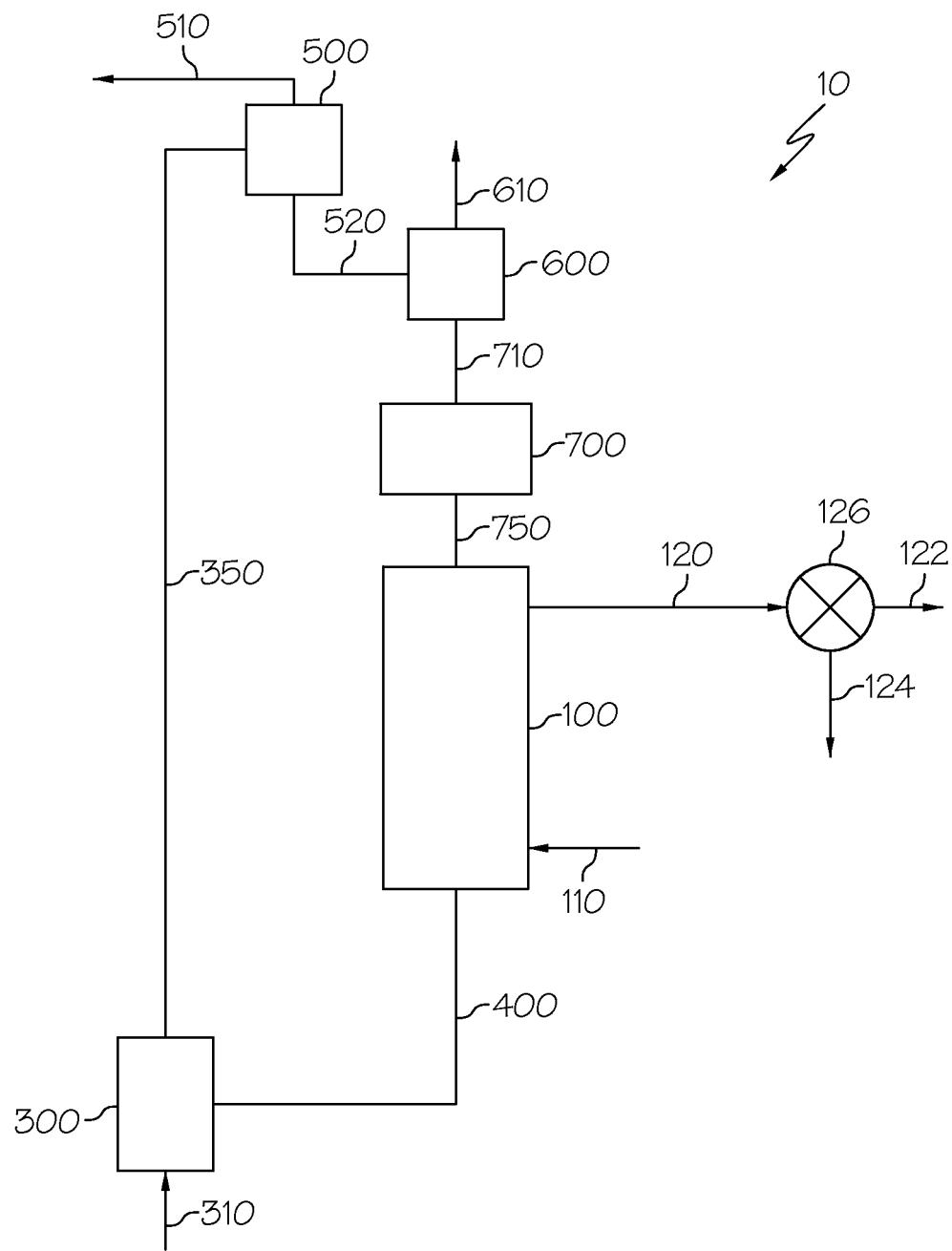
FIG. 1 is a schematic illustration of a system for converting fuel according to one or more embodiments of the present invention.

Now referring to FIG. 1, embodiments of the systems described herein may be directed to a specific configuration wherein heat and/or power may be produced from solid carbonaceous fuels. In such a fuel conversion system 10, a reduction reactor 100 may be used to convert the carbonaceous fuels from an inlet stream 110 into a $CO_2/H_2O$ rich gas in an outlet stream 120 using oxygen carrying materials. Oxygen carrying materials that enter the reduction reactor 100 from the 700 solid storage vessel 700 through connection means 750 may contain oxides of iron with an iron valence state of 3+. Following reactions which take place in the reduction reactor 100, the iron in the oxygen carrying material may be reduced to an average valence state between about 0 and 3+.

As would be familiar to one of ordinary skill in the art, the oxygen carrying materials may be fed to the reactor via any suitable solids delivery device/mechanism. These solids delivery devices may include, but are not limited to, pneumatic devices, conveyors, lock hoppers, or the like.

Referring to the reaction in the reduction reactor 100, the reduction reactor 100 generally may receive a fuel, which is utilized to reduce the at least one metal oxide of the oxygen carrying material to produce a reduced metal or a reduced metal oxide. As defined herein, "fuel" may include: a solid carbonaceous composition such as coal, tars, oil shales, oil sands, tar sand, biomass, wax, coke etc; a liquid carbonaceous composition such as gasoline, oil, petroleum, diesel, jet fuel, ethanol etc; and a gaseous composition such as syngas, carbon monoxide, hydrogen, methane, gaseous hydrocarbon gases (C1-C6), hydrocarbon vapors, etc. For example, and not by way of limitation, the following equation illustrates possible reduction reactions:

$$Fe_2O_3 + 2CO \rightarrow 2Fe + 2CO_2$$

$$16Fe_2O_3 + 3C_5H_{12} \rightarrow 32Fe + 15CO_2 + 18H_2O$$

In this example, the metal oxide of the oxygen carrying material, $Fe_2O_3$, may be reduced by a fuel, for example, CO, to produce a reduced metal oxide, Fe. Although Fe may be the predominant reduced composition produced in the reduction reaction of the reduction reactor 100, FeO or other reduced metal oxides with a higher oxidation state are also contemplated herein.

The reduction reactor 100 may be configured as a moving bed reactor, a series of fluidized bed reactors, a rotary kiln, a fixed bed reactor, combinations thereof, or others known to one of ordinary skill in the art. Typically, the reduction reactor 100 may operate at a temperature in the range of about 400° C. to about 1200° C. and a pressure in the range of about 1 atm to about 150 atm; temperatures and pressures outside these ranges may be desirable depending on the reaction mechanism and the components of the reaction mechanism.

The $CO_2/H_2O$ rich gas of the outlet stream 120 may be further separated by a condenser 126 to produce a $CO_2$ rich gas stream 122 and an $H_2O$ rich stream 124. The $CO_2$ rich gas stream 122 may be further compressed for sequestration. The reduction reactor 100 may be specially designed for solids and/or gas handling, which is discussed herein. In some embodiments, the reduction reactor 100 may be configured as a packed moving bed reactor. In another embodiment, the reduction reactor may be configured as a series of interconnected fluidized bed reactors, wherein oxygen carrying material may flow counter-currently with respect to a gaseous species.

Still referring to FIG. 1, the reduced oxygen carrying materials exiting the reduction reactor 100 may flow through a combustion reactor inlet stream 400 and may be transferred to a combustion reactor 300. The reduced oxygen carrying material in the combustion reactor inlet stream 400 may be moved through a non-mechanical gas seal and/or a non-mechanical solids flow rate control device. Such system components are described herein.

To regenerate the metal oxide of the oxygen carrying materials, the system 10 may utilize a combustion reactor 300, which is configured to oxidize the reduced metal oxide of the oxygen carrying material. The oxygen carrying material may enter the combustion reactor 300 and may be fluidized with air or another oxidizing gas from an inlet stream 310. The iron in the oxygen carrying material may be re-oxidized by air in the combustion reactor 300 to an average valence state of about 3+. The combustion reactor 300 may release heat during the oxidation of oxygen carrying material particles. Such heat may be extracted for steam and/or power generation or used to compensate the process heat requirements. In some embodiments, the combustion reactor 300 may comprise an air filled line or tube used to oxidize the oxygen carrying material. Alternatively, the combustion reactor 300 may be a heat recovery unit such as a reaction vessel or other reaction tank.

The following equation lists one possible mechanism for the oxidation in the combustion reactor 300:

$$2Fe_3O_4 + 0.5O_2 \rightarrow 3Fe_2O_3$$

Following the oxidation reaction in the combustion reactor 300, the oxidized oxygen carrying materials may be transferred to a gas-solid separation device 500. The gas-solid separation device 500 may separate gas and fine particulates in an outlet stream 510 from the bulk oxygen carrying material solids in an outlet stream 520. The oxygen carrying material may be transported from the combustion reactor 300 to the gas-solid separation device 500 through a solid conveying system 350, such as for example a riser. In one embodiment, the $Fe_3O_4$ product may be oxidized to $Fe_2O_3$ in the solid conveying system 350.

The bulk oxygen carrying material solids discharged from the gas-solid separation device 500 may be moved through a solid-solid separation device 600, through connection means 710, and to a solid storage vessel 700 where substantially no reaction is carried out. In the solid-solid separation device 500, oxygen carrying materials may be separated from other solids, which flow out of the system through an outlet 610. The oxygen carrying material solids discharged from the solid storage vessel 700 will pass through another non-mechanical gas sealing device 750 and finally return to the reduction reactor 100 to complete a global solids circulation loop.

In some embodiments, the oxygen carrying material particles may undergo numerous regeneration cycles, for example, 10 or more regeneration cycles, and even greater than 100 regeneration cycles, without substantially losing functionality. This system may be used with existing systems involving minimal design change, thus making it economical.

Figure 2:
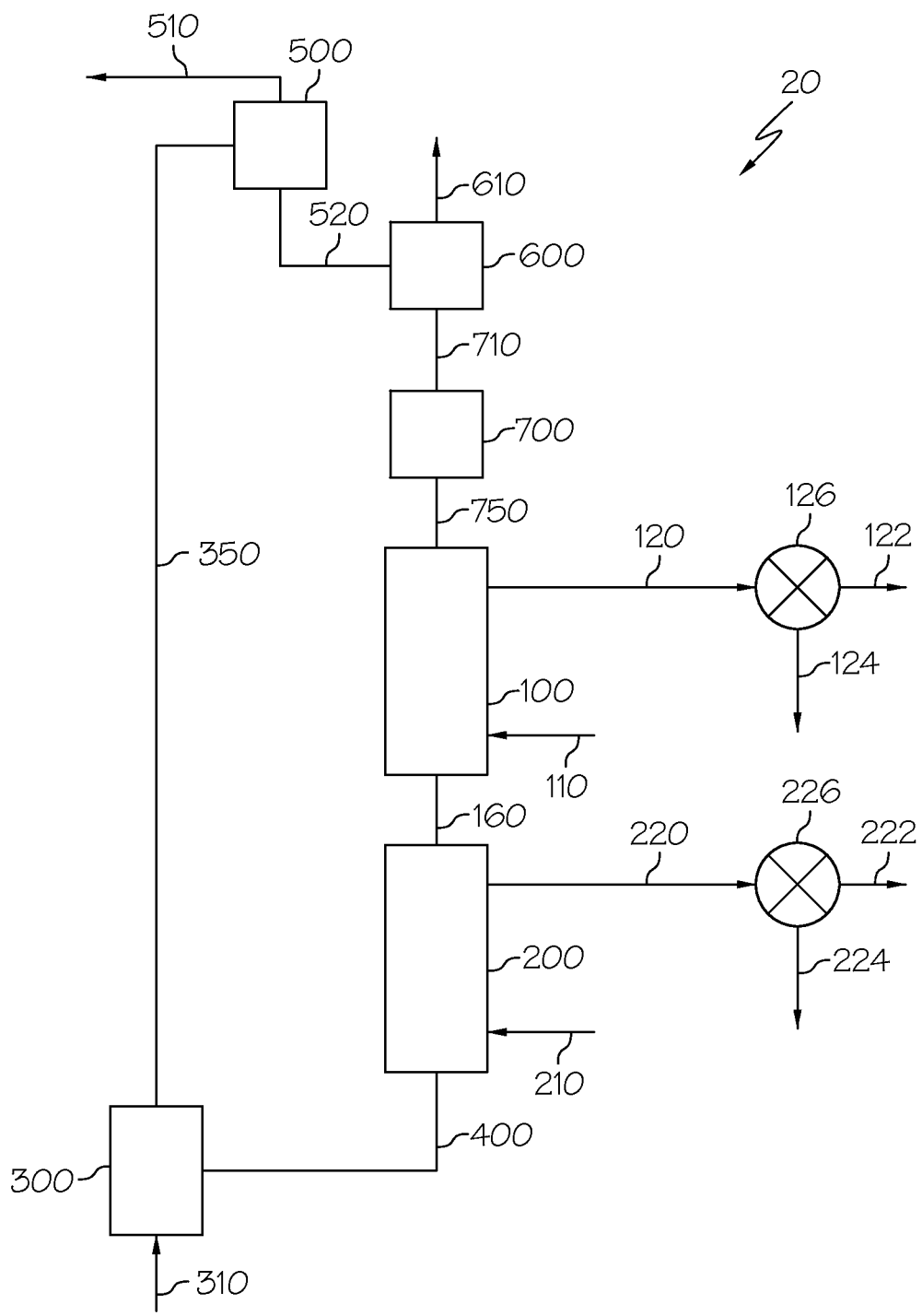
FIG. 2 is a schematic illustration of another system for converting fuel according to one or more embodiments of the present invention.

Now referring to FIG. 2, in another embodiment, $H_2$ and/or heat/power may be produced from solid carbonaceous fuels by a fuel conversion system 20 similar to the system 10 described in FIG. 1, but further comprising an oxidation reactor 200. The configuration of the reduction reactor 100 in this embodiment follows the similar configuration as the previous embodiment shown in FIG. 1. The system 20 of FIG. 2 may convert carbonaceous fuels from the reduction reactor inlet stream 110 into a $CO_2/H_2O$ rich gas stream 120 using the oxygen carrying materials that contain iron oxide with a valence state of about 3+. In the reduction reactor 100, the iron in the oxygen carrying material may be reduced to an average valence state between about 0 and 2+ for the $H_2$ production. It should be understood that the operation and configuration of the system 20 comprising an oxidation reactor 200 (a three reactor system) is similar to the operation of the system 10 not comprising an oxidation reactor (a two reactor system), and like reference numbers in FIG. 1 correspond to like parts in FIG. 2.

Similar to the system 10 of FIG. 1, the $CO_2/H_2O$ rich gas in the outlet stream 120 of the system 20 of FIG. 2 may be further separated by a condenser 126 to produce a $CO_2$ rich gas stream 122 and an $H_2O$ rich stream 124. The $CO_2$ rich gas stream 122 may be further compressed for sequestration. The reduction reactor 100 may be specially designed for solids and/or gas handling, which is discussed herein. In some embodiments, the reduction reactor 100 may be operated in as packed moving bed reactor. In another embodiment, the reduction reactor may be operated as a series of interconnected fluidized bed reactors, wherein oxygen carrying material may flow counter-currently with respect to a gaseous species.

The reduced oxygen carrying material exiting the reduction reactor 100 may be transferred through a connection means 160 that may have a non-mechanical gas-sealing device, to an oxidation reactor 200. The reduced oxygen carrying materials may be re-oxidized, with steam from an inlet stream 210. The oxidation reactor 200 may have an outlet stream 220 rich in $H_2$ and steam. Excessive/unconverted steam in the outlet stream 220 may be separated from the $H_2$ in the stream 220 with a condenser 226. An $H_2$ rich gas stream 222 may be generated. The steam inlet stream 210 of the oxidation reactor 200 may come from condensed steam recycled in the system 20 from an outlet stream 124 of the reduction reactor 100. In one embodiment, a portion of the solid carbonaceous fuel in the reduction reactor 100 may be intentionally or unintentionally introduced to the oxidation reactor 200, which may result in a $H_2$, CO, and $CO_2$ containing gas in an outlet stream 220. Such a gas stream 220 may be either used directly as synthetic gas (syngas) or separated into various streams of pure products. In the oxidation reactor 200, the reduced oxygen carrying materials may be partially re-oxidized to an average valence state for iron that is between 0 and 3+. In some embodiments, the reduction reactor 100 is configured to operate in a packed moving bed mode or as a series of interconnected fluidized bed reactors, in which oxygen carrying material may flow counter-currently against the gaseous species.

The oxidation reactor 200, which may comprise the same reactor type or a different reactor type than the reduction reactor 100, may be configured to oxidize the reduced metal or reduced metal oxide to produce a metal oxide intermediate. As used herein, "metal oxide intermediate" refers to a metal oxide having a higher oxidation state than the reduced metal or metal oxide, and a lower oxidation state than the metal oxide of the oxygen carrying material. For example, and not by way of limitation, the following equation illustrates possible oxidation reactions in the oxidation reactor 200:

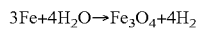
$$3Fe+4H_2O \rightarrow Fe_3O_4+4H_2$$

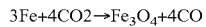
$$3Fe+4CO2 \rightarrow Fe_3O_4+4CO$$

In this example, which centers on oxygen carrying materials that may be ceramic composites that utilize $Fe_2O_3$ as the metal oxide, oxidation in the oxidation reactor 200 using steam may produce a resultant mixture that includes metal oxide intermediates comprising predominantly $Fe_3O_4$. $Fe_2O_3$ and FeO may also be present. Furthermore, although $H_2O$, specifically steam, is the oxidant in this example, numerous other oxidants are contemplated, for example, CO, $O_2$, air, and other compositions.

The oxidation reactor 200 may be configured as a moving bed reactor, a series of fluidized bed reactors, a rotary kiln, a fixed bed reactor, combinations thereof, or others. Typically, the oxidation reactor 200 may operate at a temperature in the range of about 400° C. to about 1200° C. and a pressure in the range of about 1 atm to about 150 atm; however, temperatures and pressures outside these ranges may be desirable depending on the reaction mechanism and the components of the reaction mechanism.

The oxidation reactor 200 may comprise a moving bed with a countercurrent contacting pattern of gas and solids. Steam may be introduced at the bottom of the reactor and may oxidize the reduced oxygen carrying material particles as the particles move downwardly inside the oxidation reactor 200. In this embodiment, the product formed may be hydrogen, which is subsequently discharged from the top of the oxidation reactor 200. It will be shown in further embodiments that products such as CO and syngas are possible in addition to hydrogen. Though $Fe_2O_3$ formation is possible in the oxidation reactor 200, the solid product from the oxidation reactor 200 is expected to be mainly metal oxide intermediate, $Fe_3O_4$. The amount of $Fe_2O_3$ produced in the oxidation reactor 200 depends on the oxidant used, as well as the amount of oxidant fed to the oxidation reactor 200. The steam present in the hydrogen product of the oxidation reactor 200 may then be condensed in order to provide for a hydrogen rich stream 222. At least part of this hydrogen rich stream may be recycled back to the reduction reactor 100. In addition to utilizing the same reactor type as the reduction reactor 100, the oxidation reactor 200 may similarly operate at a temperature between about 400° C. to about 1200° C. and pressure of about 1 atm to about 150 atm.

The partially re-oxidized oxygen carrying materials exiting the oxidation reactor 200 may flow through a combustion reactor inlet stream 400 and may be transferred to a combustion reactor 300. The reduced oxygen carrying material in the combustion reactor inlet stream 400 may be moved through a non-mechanical gas seal and/or a non-mechanical solids flow rate control device.

The oxygen carrying material may enter the combustion reactor 300 and may be fluidized with air or another oxidizing gas from an inlet stream 310. The iron in the oxygen carrying material may be re-oxidized by air in the combustion reactor 300 to an average valence state of about 3+. The combustion reactor 300 may release heat during the oxidation of oxygen carrying material particles. Such heat may be extracted for steam and/or power generation or used to compensate the process heat requirements.

Followed by the oxidation reactions in the combustion reactor 300, the oxidized oxygen carrying materials may be transferred in the same manner as the previous embodiment in FIG. 1, such as through a solid conveying system 350 such as a riser, to a gas-solid separation device 500, to solids separation device 600, and to solid storage vessel 700.

Figure 3:
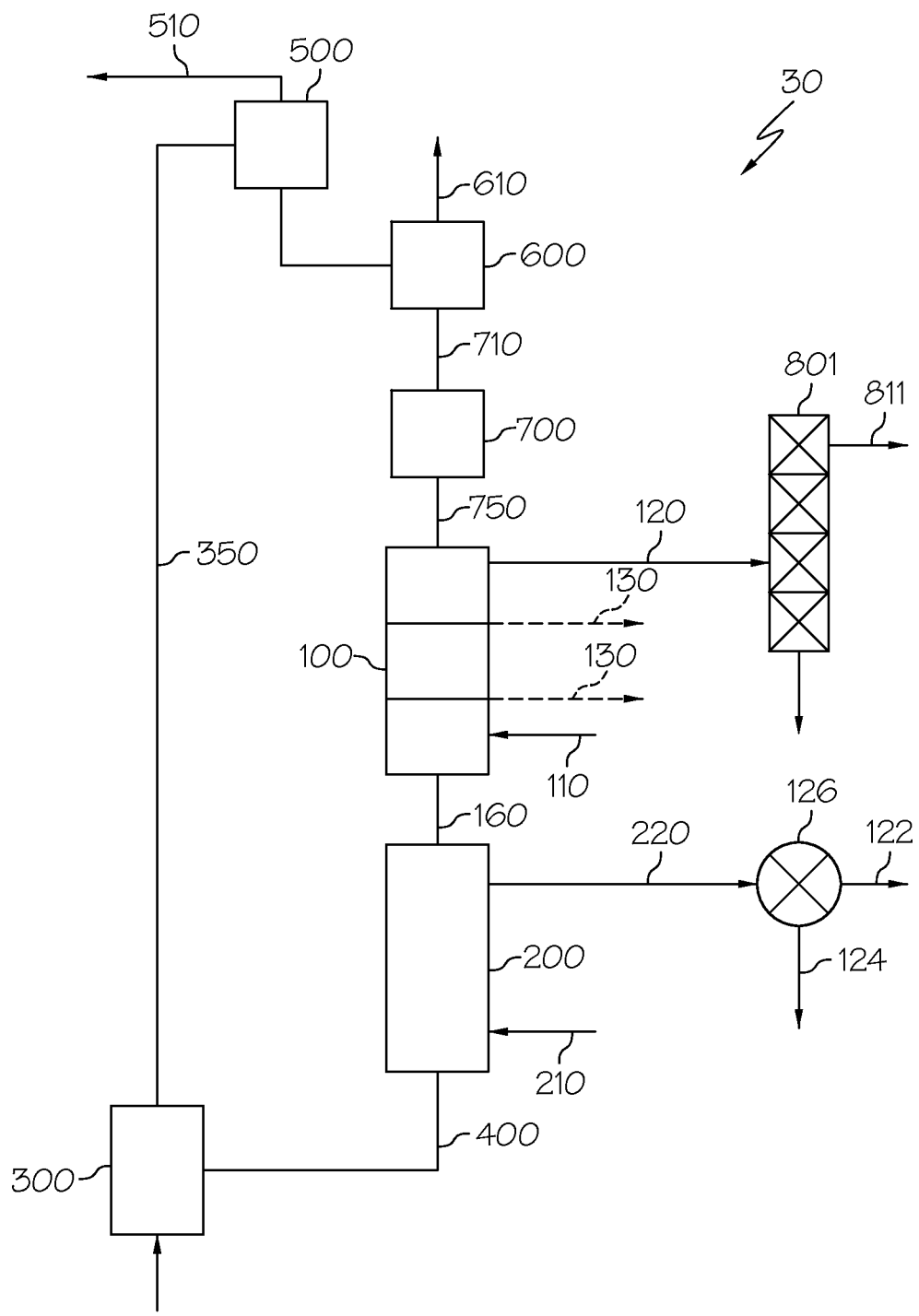
FIG. 3 is a schematic illustration of another system for converting fuel according to one or more embodiments of the present invention.

Referring now to FIG. 3, in one embodiment, a fuel conversion system 30 may be configured to produce chemicals, fuels, $H_2$, heat, and/or power are produced from carbonaceous fuels. A reduction reactor 100 may be used to convert the carbonaceous fuels from an inlet stream 110 into a hydrocarbon containing, preferably ethylene ($C_2H_4$), gas outlet stream 120 using oxygen carrying materials that may contain oxides of manganese and/or iron. The desired hydrocarbon product may be withdrawn from the top of the reduction reactor in a stream 120 or slip streams 130 along the reduction reactor 100. The hydrocarbon containing stream 120 may be further processed in necessary separation/upgrade units 801. The hydrocarbon from reduction reactor 100 may be separated and used as a bulk chemical or may be upgraded into liquid fuels such as gasoline and/or diesel in an outlet stream 811. A function of the oxygen carrying material in the reduction reactor 100 may be to donate oxygen to carbonaceous fuels in order them to be partially oxidized and reformed into hydrocarbons such as $C_2H_4$. The metal oxide in the oxygen carrying material may be partially reduced in the reduction reactor. In some embodiments, the reduction reactor 100 is operated in a packed moving bed reactor configuration or as a series of interconnected fluidized bed reactors, in which the oxygen carrying materials may flow counter-currently relative to a gaseous species.

The reduced oxygen carrying material may then be transferred through a non-mechanical gas-sealing device 160 to an optional oxidation reactor 200. In the oxidation reactor 200, the reduced oxygen carrying materials may be re-oxidized, with steam from an inlet stream 210, into a $H_2$ containing gas stream 220. Steam in the outlet stream 220 may be further condensed in a condenser 126, generating a $H_2$ rich gas stream 122 and a steam rich stream 124. The outlet stream 122 may be used to upgrade the hydrocarbon products generated in the reduction reactor 100. In some embodiments, at least a portion of the carbonaceous fuel may be intentionally or unintentionally introduced to the oxidation reactor 200, which may result in a $H_2$, CO, and $CO_2$ containing gas stream 220. Such a gas stream 220 may either be used directly as syngas or may be separated into various streams of pure products. In some embodiments, the reduction reactor may be configured to operate as a packed moving bed reactor or a series of interconnected fluidized bed reactors, in which oxygen carrying materials may flow counter-currently relative to a gaseous species.

The re-oxidized oxygen carrying material may then be transferred, through a combustion reactor inlet stream 400 optionally comprising a non-mechanical gas seal and/or a non-mechanical solids flow rate control device, to a combustion reactor 300, where it may be fluidized with air. The metal oxides are further oxidized in the combustion reactor 300. The combustion reactor may release heat. Such heat may either be extracted for steam and/or power generation or used to compensate the process heat requirements.

Following oxidation reactions in the combustion reactor 300, the oxidized oxygen carrying materials may be transferred in the same manner as the previous embodiment in FIGS. 1 and 2, through a riser 600, into a gas-solid separation device 500, solids separation device 600, and solid storage vessel 700.

By controlling the amount of steam in the oxidation reactor inlet stream 210, the overall ratio of production rates among hydrocarbons, $H_2$, and power may be adjusted. In the case when $H_2$ is not the desired product, the oxidation reactor may be by-passed and reduction reactor 100 and combustion reactor 300 may be directly connected through the combustion reactor inlet stream, similar to the embodiment of FIG. 1.

Figure 4:
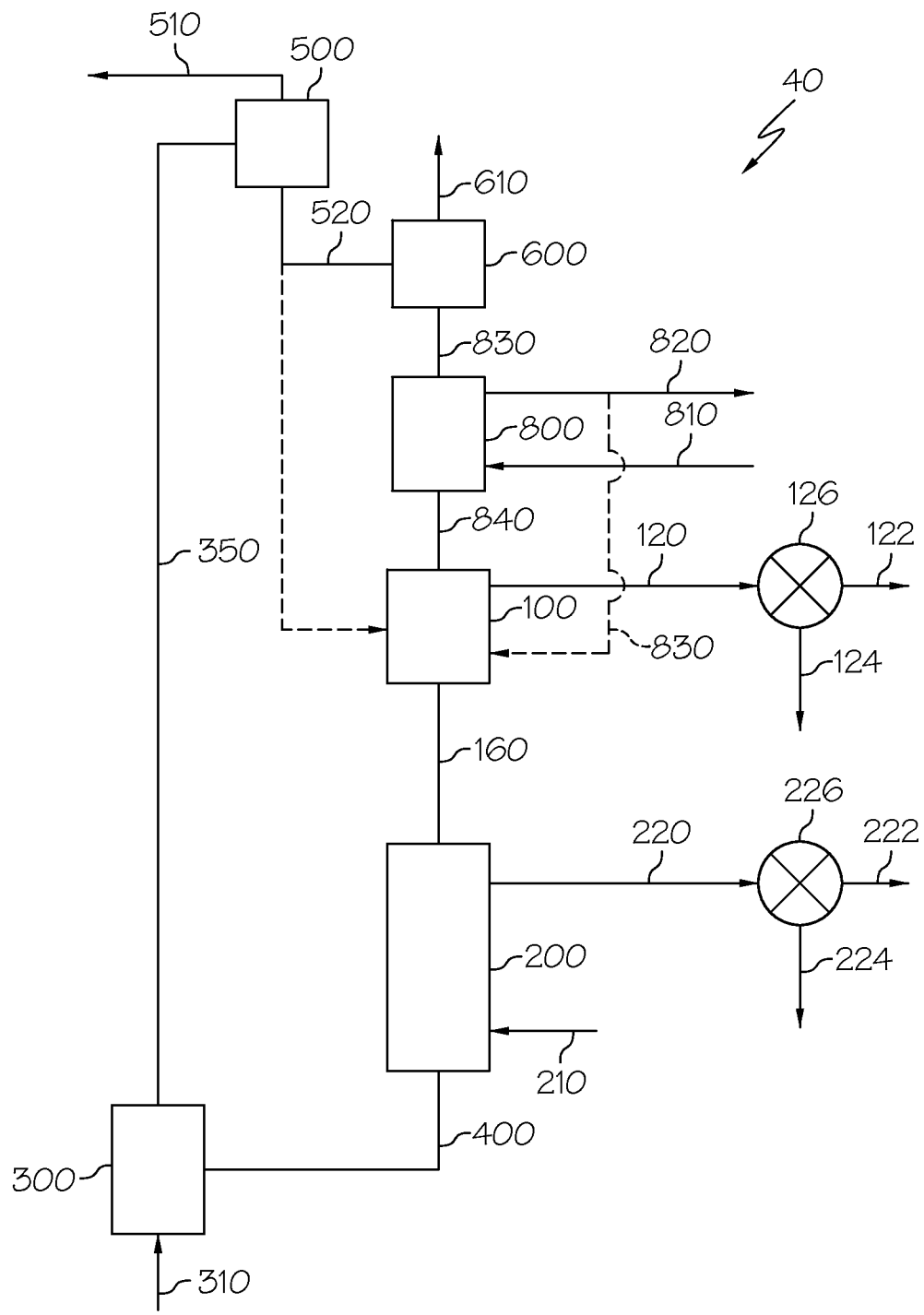
FIG. 4 is a schematic illustration of another system for converting fuel according to one or more embodiments of the present invention.

Now referring to FIG. 4, in another embodiment, a fuel conversion system 40 may be directed to a configuration where pyrolysis oil, $H_2$, heat and/or power is co-produced from carbonaceous fuels from an inlet stream 810, preferably solid carbonaceous fuels such as biomass, oil shell and/or coal. Under such a configuration, a pyrolyzer reactor 800 may be used to convert the carbonaceous fuels from the inlet stream 810 into pyrolysis oil and/or fixed carbon. The heat for pyrolysis may be provided by a high temperature oxygen carrying material particle that may contain iron oxide with a valence state of 3+. The oxygen carrying material may be slightly reduced in the pyrolyzer reactor 800. The carbon may then be carried over, along with the oxygen carrying materials, to the reduction reactor 100 where it is oxidized to a $CO_2$ rich gas stream 120 by the oxygen carrying materials. The steam in the outlet stream 120 may be further separated by a condenser 126 to produce a $CO_2$ rich gas stream 122, which may be further compressed for sequestration. The metal in the oxygen carrying materials may be reduced to an average valence state between 0 and 2+. At least a portion of the undesired fraction of the pyrolysis products in the outlet stream 820 may be introduced to the reduction reactor as a reducing agent through an inlet stream 830. In some embodiments, the reduction reactor may be operated as a packed moving bed reactor or a series of interconnected fluidized bed reactor where oxygen carrying material flows counter-currently with respect to the gaseous species.

The reduced oxygen carrying material may then be transferred, through a non-mechanical gas-sealing device 160, to an optional oxidation reactor 200. The reduced oxygen carrying material may be re-oxidized, with steam, producing an $H_2$ containing gas outlet stream 220. Steam in the gas stream 220 may be separated by a condenser 226, generating a $H_2$ rich gas stream 222. $H_2$ may be used to upgrade the pyrolysis oil produced from the reduction reactor 100. For the steam inlet stream 210 of the oxidation reactor 200, usage of condensed steam in outlet stream 124 from the reduction reactor may be optional. In some embodiments, a portion of the carbonaceous fuel may be intentionally or unintentionally introduced to the oxidation reactor 200, which may result in a $H_2$, CO, and $CO_2$ containing gas in the outlet stream 220. Such a gas stream may be either used directly as syngas or separated into various streams of pure products. In the oxidation reactor 200, the iron oxide in the reduce oxygen carrying material is also re-oxidized to an average valence state that is between 0 and 3+. In some embodiments, the oxidation reactor 200 may be operated as a packed moving bed reactor or a series of interconnected fluidized bed reactor where oxygen carrying material flows counter-currently with respect to the gaseous species.

Still referring to FIG. 4, the reduced oxygen carrying materials exiting the reduction reactor 100 may flow through a combustion reactor inlet stream 400 and may be transferred to a combustion reactor 300. The reduced oxygen carrying material in the combustion reactor inlet stream 400 may be moved through a non-mechanical gas seal and/or a non-mechanical solids flow rate control device. Such system components are described herein. To regenerate the metal oxide of the oxygen carrying materials, the system 10 may utilize a combustion reactor 300, which is configured to oxidize the reduced metal oxide. The oxygen carrying material may enter the combustion reactor 300 and may be fluidized with air or another oxidizing gas from an inlet stream 310. The iron in the oxygen carrying material may be re-oxidized by air in the combustion reactor 300 to an average valence state of about 3+. The combustion reactor 300 may release heat during the oxidation of oxygen carrying material particles. Such heat may be extracted for steam and/or power generation or used to compensate the process heat requirements. In some embodiments, the combustion reactor 300 may comprise an air filled line or tube used to oxidize the metal oxide. Alternatively, the combustion reactor 300 may be a heat recovery unit such as a reaction vessel or other reaction tank.

Following the oxidation reaction in the combustion reactor 300, the oxidized oxygen carrying materials may be transferred to a gas-solid separation device 500. The gas-solid separation device 500 may separate gas and fine particulates in an outlet stream 510 from the bulk oxygen carrying material solids in an outlet stream 520. The oxygen carrying material may be transported from the combustion reactor 300 to the gas-solid separation device 500 through solid conveying system 350, such as for example a riser. In one embodiment, the $Fe_3O_4$ product may be oxidized to $Fe_2O_3$ in the solid conveying system 350.

The bulk oxygen carrying material solids discharged from the gas-solid separation device 500 may be moved through a solid-solid separation device 600, through connection means 710, and to a solid storage vessel 700 where substantially no reaction is carried out. In the solids separation device 500, oxygen carrying materials may be separated from other solids, which flow out of the system through an outlet 610. The oxygen carrying material solids discharged from the solid storage vessel 700 will pass through another non-mechanical gas sealing device 750 and finally return to the reduction reactor 100 to complete a global solids circulation loop.

Alternatively, a portion of the oxygen carrying materials from the gas-solid separation device 500 may by-pass the solid-solid separation device 600 and pyrolyzer reactor 800 and enter directly into the reduction reactor 100 through a stream 550.

Alternatively, a portion of the carbonaceous fuels in the inlet stream 310 may be directly introduced to the combustion reactor 100. By controlling the amount of steam in inlet stream 210 to the oxidation reactor 200 and the fuel injection ratio between the reduction reactor 100 and pyrolysis reactor 800, the overall product ratio among pyrolysis products, $H_2$, and power may be adjusted. In the case when $H_2$ is not the desired product, the oxidation reactor 200 may be by-passed and the reduction reactor 100 and/or the solid conveying system 350 such as a riser may be directly connected through the non-mechanical gas seal and solids flow rate control device, in order to compensate the heat requirement in the reduction reactor 100.

Figure 5:
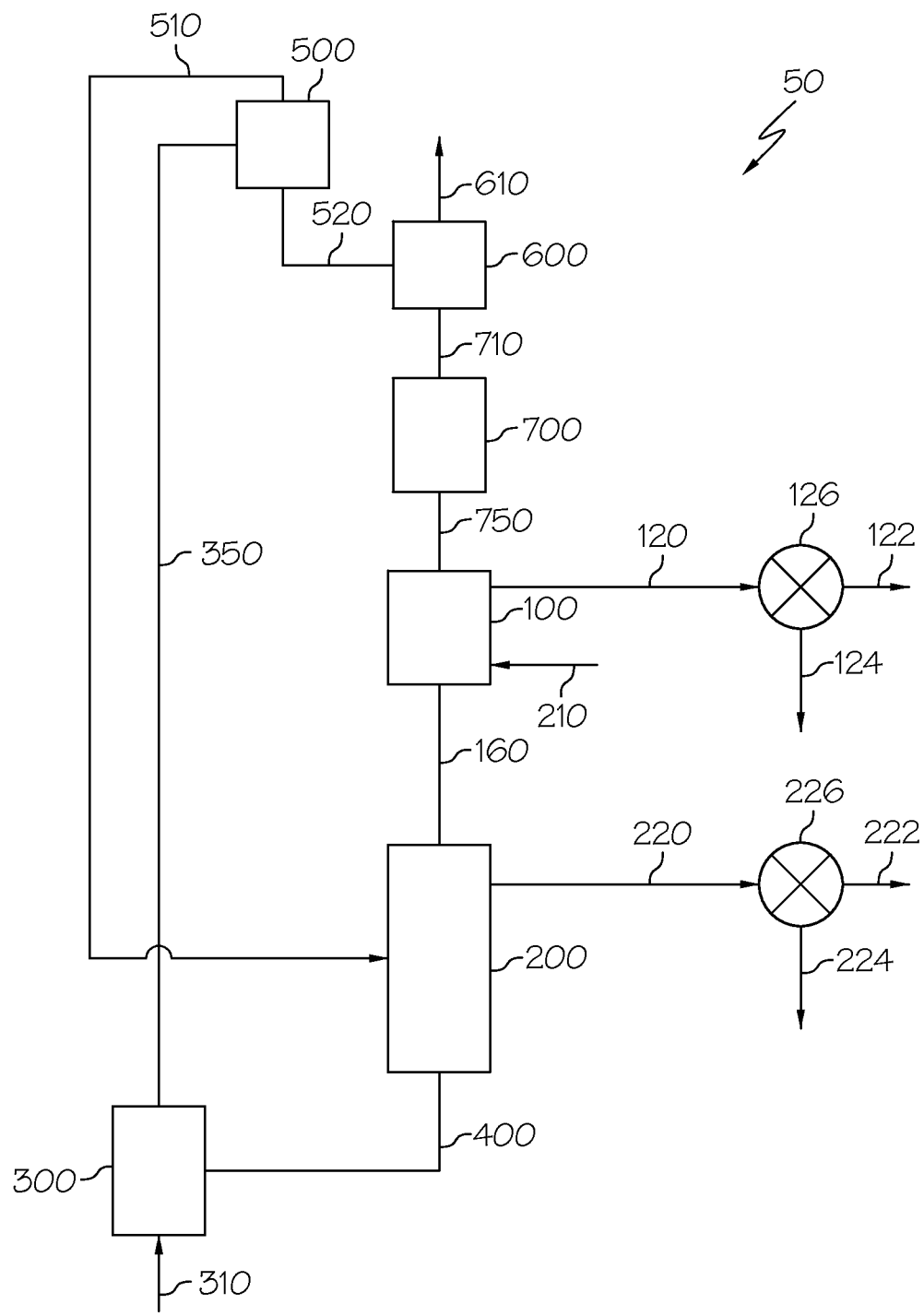
FIG. 5 is a schematic illustration of another system for converting fuel according to one or more embodiments of the present invention.

Now referring to FIG. 5, in another embodiment, the oxidization step of the fuel conversion system 50 may be completed in two or more steps in order for better energy management. Two oxidizers 200, 300 may be used for oxygen carrying material regeneration. The air first goes to the second oxidation reactor or combustion reactor 300 and then the first oxidation reactor 200. The oxidation reactor 200 may be configured as a moving bed design with countercurrent gas solid flow pattern. Such design may ensure a better conversion for the depleted air stream 510 by contacting it with more reduced oxygen carrying material in the first oxidation reactor 200. The combustion reactor 300 is configured as a fluidized bed using air stream 310 to ensure the complete oxidation of oxygen carriers from the first oxidizer 200. The completely oxidized oxygen carrier particles are then transferred through a solid conveying system 350, such as a riser. Depleted air used in the combustion reactor 300 and the solid conveying system 350 is used to oxidize and transfer the particles, respectively, and is recycled to the first oxidation reactor 200. Such an embodiment may reduce the reactor size and excess air requirement.

Figure 6:
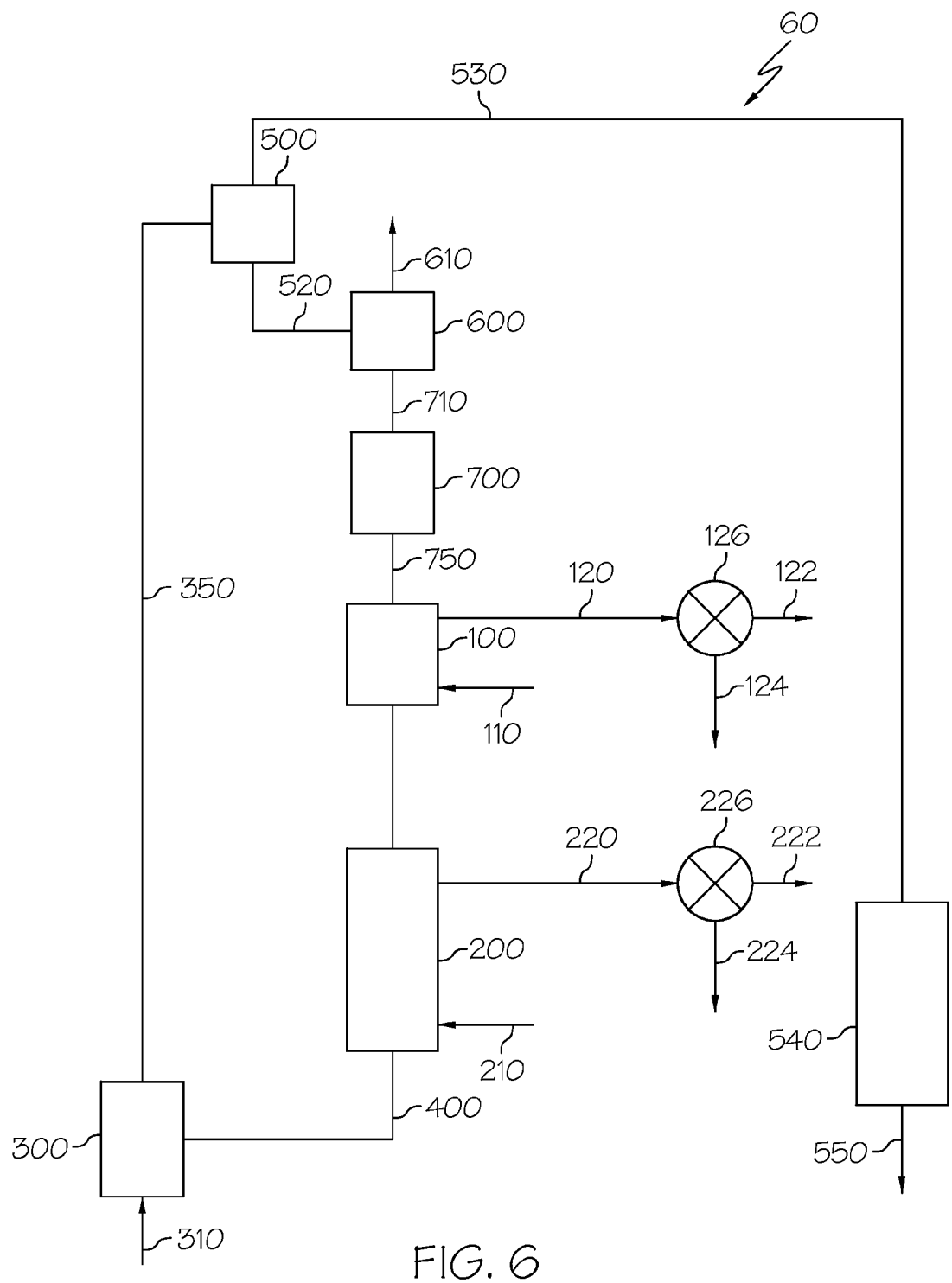
FIG. 6 is a schematic illustration of another system for converting fuel according to one or more embodiments of the present invention.

Now referring to FIG. 6, in another embodiment, the fuel conversion system 60 may comprise a two step oxidization process that converts fuel. Iron oxide may be a preferred oxygen carrying material in this embodiment, and the oxidant used in the oxidation reactor 200 may be steam. By steam-iron reaction, the reduced iron oxide particle may be partially oxidized to $Fe_3O_4$ and hydrogen may be produced. The hydrogen may be used as fuel for a gas turbine or feedstock for chemical synthesis in a reactor 540. The combination of the hydrogen stream from the oxidation reactor 200 and the nitrogen stream from the combustion reactor 300, the reactor system 550 may be integrated for ammonia synthesis. In some embodiments, the disclosed design could improve the ammonia yield by more than 10%.

Figure 7:
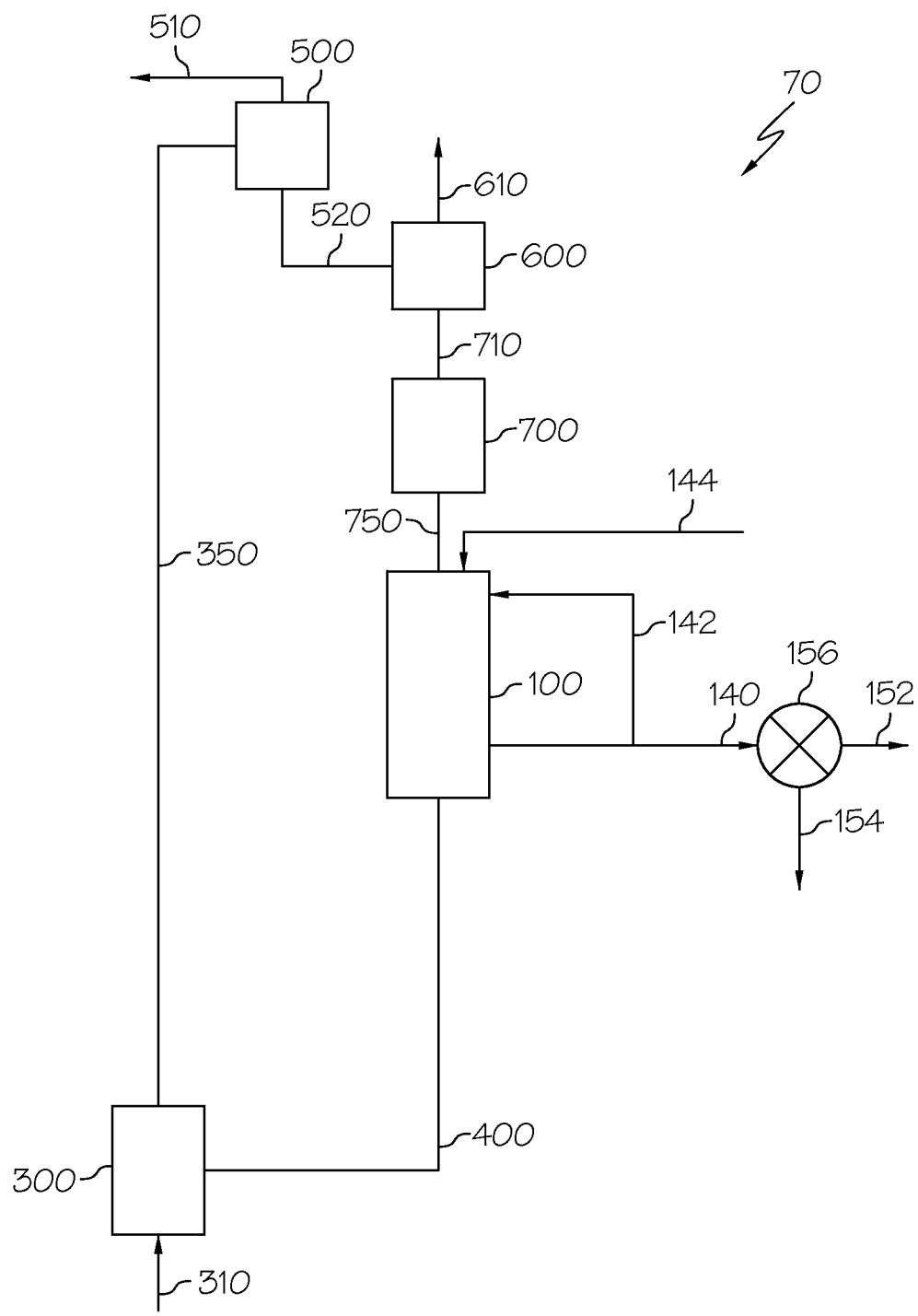
FIG. 7 is a schematic illustration of another system for converting fuel according to one or more embodiments of the present invention.

Now referring to FIG. 7, in another embodiment, a fuel conversion system 70 may utilize oxygen uncoupling materials from the oxides of copper, manganese, and/or cobalt. In this embodiment, both the solid fuel and oxides of copper, manganese, and/or cobalt are introduced in the top of the reduction reactor 100 through an inlet stream 144 and move downwards. A recycled stream 142 consisting of mainly $CO_2$ and $H_2O$ is used to force the released oxygen moving downward for fuel conversion. The spent oxides of copper, manganese, and/or cobalt may then be discharged from the bottom of the reduction reactor 100 and may be sent to the combustion reactor 300 for regeneration with air in inlet stream 310. Via the concurrent flow in the moving bed reduction reactor 300, the oxygen release rate and extent may be controlled so that no low melting point materials form during the conversion, which avoids the agglomeration of the copper, manganese, and/or cobalt based oxygen carrying materials.

Figure 8:
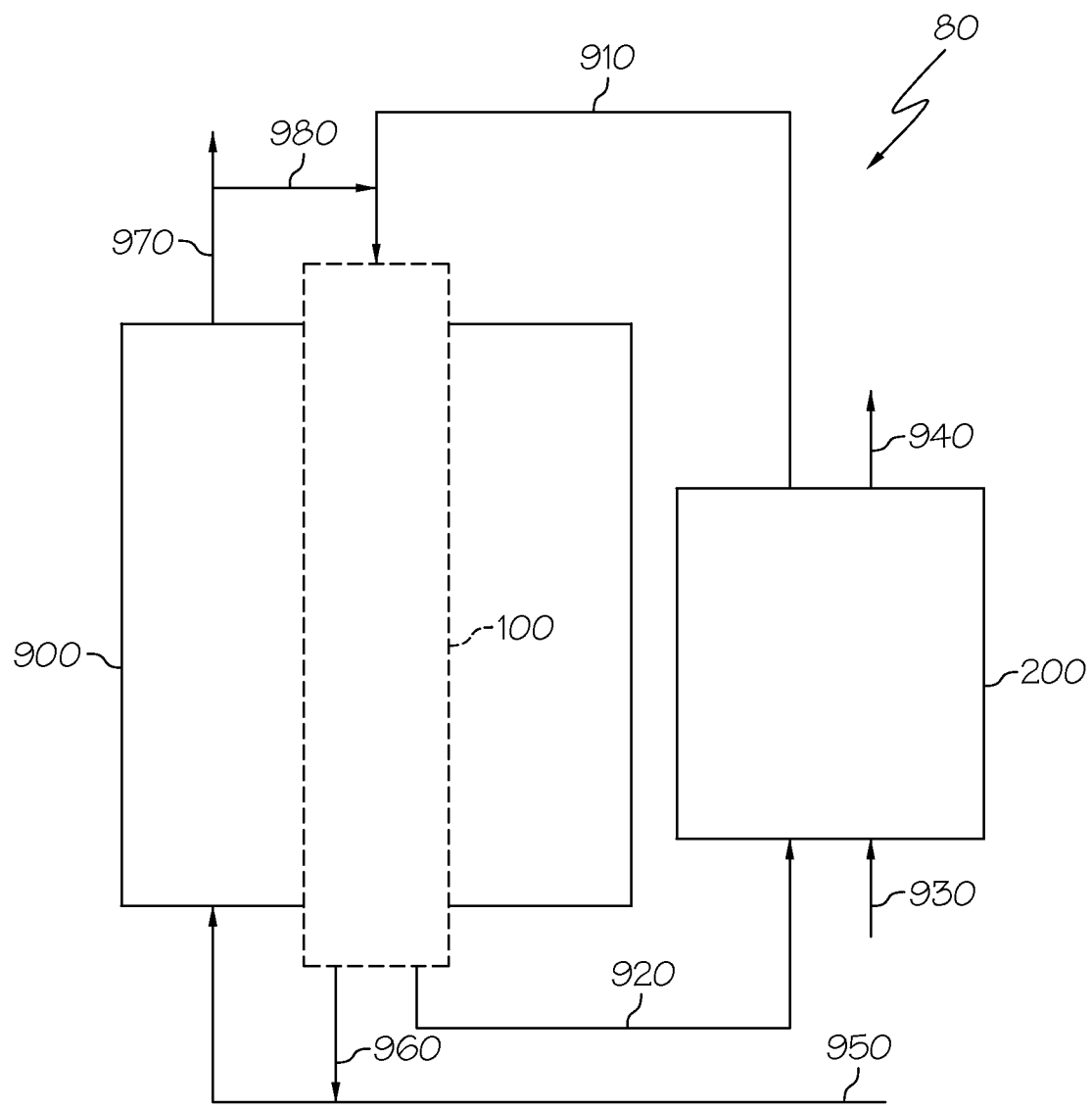
FIG. 8 is a schematic illustration of another system for converting fuel according to one or more embodiments of the present invention.

Now referring to FIG. 8, in another embodiment, a fuel conversion system 80 may comprise a reduction reactor 100 that may be an oxygen release reactor, which may perform the oxygen release from copper, manganese, and/or cobalt, and may be embedded in a fluidized bed combustion (FBC) boiler 900 for the combustion of carbonaceous fuels in an inlet stream 950. Oxygen may be released from the oxides of copper, manganese, and/or cobalt in the reduction reactor 100, and the effluent gas may be a mixture $CO_2$, $H_2O$ and $O_2$ from the combustion reactor 300, which may enter an inlet stream 950 and be used for fuel combustion in the FBC boiler 900. Inside the reduction oxygen release reactor 100, gas species flow downward concurrently with the oxides of copper, manganese, and/or cobalt and exit through an outlet stream 960. At least portion of the exhaust gas stream 970 from the FBC boiler 900 may be recycled to the reduction reactor 100 through an inlet stream 910. The heat required for oxygen decoupling in the reduction reactor 100 may be transferred from the FBC boiler 900. This integration minimizes the fuel contact with copper, manganese and/or cobalt-based oxygen carrier particles and thus ensures its recyclability. An oxidation reactor 200 may be in communication with the reduction reactor 100 through connection means 920 and connection means 910. Gas inlet 930 and gas outlet 940 may function similarly to oxidation reactor inlet and outlet streams in the embodiments described herein.

The reactors of the systems described herein may be constructed with various durable materials suitable to withstand temperatures of up at least 1200° C. The reactors may comprise carbon steel with a layer of refractory on the inside to minimize heat loss. This construction also allows the surface temperature of the reactor to be fairly low, thereby improving the creep resistance of the carbon steel. Other alloys suitable for the environments existing in various reactors may also be employed, especially if they are used as internal components configured to aid in solids flow or to enhance heat transfer within a moving bed embodiment. The interconnects for the various reactors can be of lock hopper design or rotary/star valve design to provide for a good seal. However, other interconnects as can be determined easily by a person skilled in the art may also be used.

Various mechanisms can be used for solid transportation in the numerous systems disclosed herein. For example, in some embodiments the solid transportations systems described herein may be transport systems using a pneumatic conveyor driven by air, belt conveyors, bucket elevators, screw conveyors, moving beds and fluidized bed reactors. The resultant depleted air stream may be separated from the particles and its high-grade-heat content recovered for steam production. After regeneration, the oxygen carrying material particle may not be substantially degraded and may maintain full particle functionality and activity.

Heat integration and heat recovery within the system and all system components may be desirable. Heat integration in the system is specifically focused on generating the steam for the steam requirements of the oxidation reactor 200. This steam may be generated using the high grade heat available in the hydrogen, $CO_2$ and depleted air streams exiting the various system reactors 100, 200, and/or, 300, respectively. In the process described herein, there may be a desire to generate pure oxygen. To generate this pure oxygen, at least part of the hydrogen may be utilized.

The residence time in each reactor is dependent upon the size and composition of individual oxygen carrying material particles, as would be familiar to one or ordinary skill in the art. For example, the residence time for a reactor comprising Fe based metal oxides may range from about 0.1 to about 20 hours.

In some embodiments, additional unwanted elements may be present in the system. Trace elements like Hg, As, Se are not expected to react with $Fe_2O_3$ at the high temperatures of the process. As a result they are expected to be present in the $CO_2$ stream produced. If $CO_2$ is to be used as a marketable product, these trace elements may be removed from the stream. Various cleanup units, such as mercury removal units are contemplated herein. Similar options will need to be exercised in case the $CO_2$ stream is let out into the atmosphere, depending upon the rules and regulations existing at that time. If it is decided to sequester the $CO_2$ for long term benign storage, e.g. in a deep geological formation, there may not be a need to remove these unwanted elements. Moreover, $CO_2$ may be sequestered via mineral sequestration, which may be more desirable than geological storage, because it may be safer and more manageable.

Furthermore, sulfur may constitute an unwanted element, which must be accounted for in the system. In a solid fuel conversion embodiment, sulfur, which is present in coal, is expected to react with $Fe_2O_3$ and form FeS. This will be liberated on reaction with steam in the oxidation reactor 200 as $H_2S$ and will contaminate the hydrogen stream. During the condensation of water from this steam, most of this $H_2S$ will condense out. The remaining $H_2S$ can be removed using conventional techniques like amine scrubbing or high temperature removal using a Zn, Fe or a Cu based sorbent. Another method for removing sulfur would include the introduction of sorbents, for example, CaO, MgO, etc. Additionally, sorbents may be introduced into the reduction reactor 100 in order to remove the sulfur and to prevent its association with Fe. The sorbents may be removed from the system using ash separation device.

Although some embodiments of the present system are directed to producing hydrogen, it may be desirable for further treatment to produce ultra-high purity hydrogen. As would be familiar to one of ordinary skill in the art, some carbon or its derivatives may carry over from the reduction reactor 100 to the oxidation reactor 200 and contaminate the hydrogen stream. Depending upon the purity of the hydrogen required, it may be necessary to use a pressure swing adsorption (PSA) unit for hydrogen to achieve ultra high purities. The off gas from the PSA unit may comprise value as a fuel and may be recycled into the reduction reactor 100 along with coal, in solid fuel conversion embodiments, in order to improve the efficiency of hydrogen production in the system.

It should be understood that the while several of the embodiments of the systems described herein utilized an oxygen carrying material comprising an iron oxide, other oxygen carrying material may be used in the fuel conversion systems described herein.

Reduction Reactor Design

Direct conversion of solid fuels in the chemical looping process may be considered to occur in two stages, i.e. gaseous volatile conversion and non-volatile containing solid fuel conversion. In some embodiments, a packed moving bed configuration is used in the present system for the reduction reactor 100 in the systems of FIGS. 1-8. The reduction reactor 100 shown in FIGS. 1-8 may be replaced with a series of fluidized beds for some cases. When solid fuels are injected into the reduction reactor 100 through a solid fuel delivery and injection system, the gaseous volatile matters in the solid fuels are rapidly evolved and carried with gases to the upper section of the reduction reactor 100. In this section, the volatiles may be converted by oxygen donated from the oxygen carrying material particles.

As the gaseous volatiles are converted in the upper section of the reduction reactor 100, the remains of solid fuel may be converted with aid of oxygen carrying materials and oxidizing gases throughout the reduction reactor 100 or in certain regions of the reduction reactor 100. The oxidizing gases may prompt the conversion of remaining solid fuels and provide consequent reducing gases for reduction of metal oxides to lower their oxidation state. In some embodiments, fresh $CO_2$ or $H_2O$ or recycled $CO_2/H_2O$ stream from the outlet of the reduction reactor 100 may be used as the oxidizing agents, but $O_2$ may also be an acceptable oxidizing gas for the promotion of solid fuel conversion. Reductive gases such as CO and $H_2$ may be formed from the gasification of remains of solid fuel and may lead to the reduction of metal oxides.

In the packed moving bed configuration, the conversion strategy of remains of solid fuel is determined by the gas velocity conceived by the oxidizing gases mentioned above, reactor design, or the configuration of solid fuel injection in the reducer. A feature of the packed moving bed is to provide gas and oxygen carrying material particles in a counter-current contact pattern, and the flow pattern of solid fuel is decided in such way that enough residence time is provided for the conversion. The solid fuels may flow counter-currently or co-currently with respect to the flow of oxygen carrying materials.

Because the solid fuel conversion process evolves gases as they are converted, the gas velocity in the packed moving bed needs to be carefully regulated, in order to maintain the moving bed regime throughout the reduction reactor 100. One or more stage of taper-shape connections, which have a larger cross-sectional area on the upper section, may be utilized to reduce the gas velocity in the upper section where evolved gases flow towards. The number of stages for tapers and angle and height of tapers may be determined based on the solid fuel conversion expectancy and hydrodynamics of oxygen carrying materials and solid fuels. In some embodiments, the oxygen carrying material particle size prefers to be large enough such that they flow counter-currently with gases in the packed moving bed manner in the reduction reactor 100 and the oxidation reactor 200 and solids fluidization/entrainment is generally achievable and practical in the combustion reactor 300 and the solid conveying system 350, respectively. Another potential strategy is to withdraw a portion of the gas from intermediate section of the reactor. This gas may either be directly used as a fuel gas/chemical looping or separated and with the fuel portion recycled.

Figure 9A:
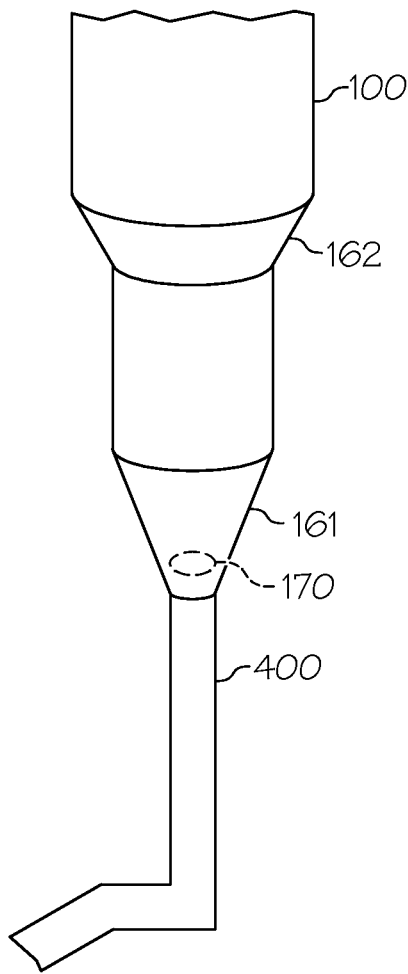
FIG. 9A is a side-view schematic illustration of a reduction reactor of a system for converting fuel according to one or more embodiments of the present invention.

FIG. 9A depicts an embodiment of a packed moving bed reducer reactor, which corresponds to the reduction reactor 100 in FIGS. 1-8. At the bottom of the reduction reactor 100, the oxidizing gas mentioned above is introduced through a ring-type gas distributor acting as an injection gas port 170 for its better distribution. The gas velocity gradually decreases at the upper section of taper union as the cross-sectional area of taper increases. In other embodiment shown in FIG. 9B, the reduction reactor 100 may have multiple injection gas ports 170 along a tapered section of the reactor wall disposed annularly. This embodiment allows oxidizing gas to locally aerate the solids, which prevents the bridging formation near the taper. Wide range of particle size distribution may cause solids to be locked up in the taper.

Figure 9B:
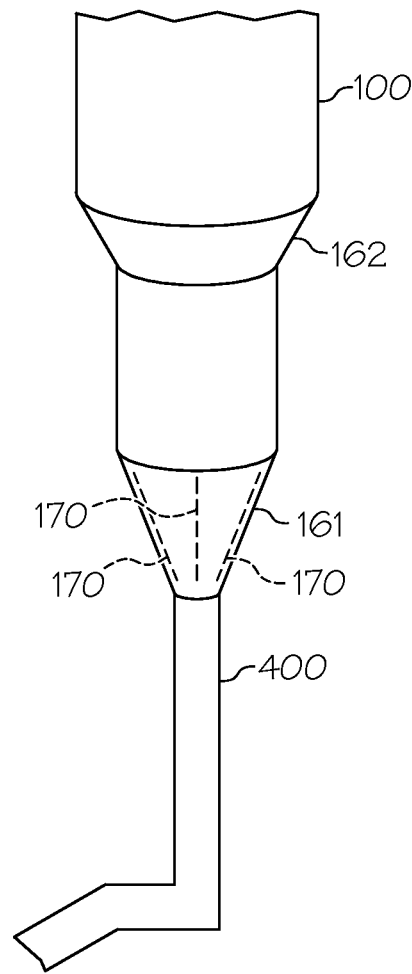
FIG. 9B is a side-view schematic illustration of another reduction reactor of a system for converting fuel according to one or more embodiments of the present invention.

Referring now to FIGS. 9A and 9B, the reduction reactor may comprise a geometry with multiple tapers, such as a first taper 161 and a second taper 162. The tapered design allows for the reduction reactor 100 to have a larger cross sectional area in higher regions than in lower regions, such that the reduction reactor 100 has a larger cross sectional area at its top than at its bottom. It should be understood that the reduction reactor 100 may have one taper or not tapers at all. In some embodiments, the reduction reactor may have more than two tapers. The tapers may have different sizes and shapes respectively. In one embodiment of the reduction reactor 100, the entire vertical length of the reduction reactor 100 may be tapered, such that the cross sectional area increases continually with respect to the vertical height of the reduction reactor 100.

Referring now to FIG. 10, in some embodiments, a larger vessel size of the reduction reactor 100 may be used, and multiple tapered sections in parallel may be applied at the bottom stage of the reduction reactor 100, such that the reduction reactor has multiple outlet streams. A first taper 177 and a second taper 176 may both emanate from the bottom section of the reduction reactor 100 and form multiple outlets for oxygen carrying material. Multiple taper connections may prevent excessive stress on single taper and channel flow of solids. In this embodiment, multiple non-mechanical valves may be installed to transfer particles to multiple combustors. Then, identical riser, gas-solid separation system and solid-solid separation may be repeated in parallel.

A series of fluidized beds may alternatively be used for the solid fuel conversion and/or $H_2$ production, in the reduction reactor 100 and the oxidation reactor 200, respectively. In such a configuration, the preferred oxygen carrying material particle size range may be between about 50 and about 2,000 microns. Both oxygen carrying materials and solid fuel remains are fluidized by oxidizing inlet gas and intermediate and products gases from the reactions. In some configurations of multistage fluidized beds, the gases and oxygen carrying materials exchange oxygen counter-currently. Alternatively, the solid fuels and oxygen carrying materials may flow together co-currently and/or flow counter-currently in some embodiments.

In one embodiment, the co-current flow of a series of fluidized bed has inlets and outlets of solid fuels (if any) and oxygen carrying material that are identical, and the oxidizing gases are introduced into a first fluidized bed at the bottom of the series of fluidized beds, which takes solids input from a second fluidized bed above the first fluidized bed and produces a final output of solids. The resultant gases from the first fluidized bed may move into the second fluidized bed. The recycled oxygen carrying materials from the storage vessel are introduced into the upper most fluidized bed. Injection of solid fuels may be made at any of the fluidized beds. The interchanges of gases and solids reputably occur between each fluidized bed. In the co-current flow of series of fluidized bed, the oxygen carrying materials and solid fuels typically have similar properties of hydrodynamics. The oxygen carrying material and solid fuel particle sizes also prefer to be in the range where their simultaneous fluidization is achievable and practical in the reduction reactor 100 and/or the oxidation reactor 200.

In the counter-current flow of series of fluidized beds, where the solid fuels and oxygen carrying materials flow into the opposite direction of each other, the solid fuels may be entrained out from each fluidized bed along with gases, whereas the oxygen carrying materials may be continuously fluidized in each reactor before they are transported to the next ones. For this counter-current fluidized bed operation, the density and size of the oxygen carrying material particle needs to be suitable such that the fluidized regime is maintained in each fluidized reactor and solid fuels are small enough for the quick entrainment by gas for easy separation from the oxygen carrying materials.

Flow Regime

Now referring to FIG. 11, in one embodiment of a packed moving bed reactor, the oxidizing gas 150 has a velocity at the lower section of a taper 161 that is between the terminal velocity of remains of solid fuels 140 and the minimum fluidization velocity of oxygen carrying materials 130. The reactor may be configured as a packed moving bed where flow directions of solid fuels 140 and oxygen carrying materials 130 is counter-current. The oxidizing gas 150 at high velocity is added to the lower section of the taper 161, and the remains of solid fuel flow with the oxidizing gas 150 through the void space of descending oxygen carrying materials 130. In this embodiment, the gas-solid-solid contacting mode may prefer a relatively large size of particle of oxygen carrying material 130 (any size between about 1 mm and 10 mm), a pulverized solid fuel particles 140 that is smaller than oxygen carrying materials 130 (any size between about 1 µm and about 1,000 µm), and a relatively high oxidizing gas 150 flow velocity (higher than minimum fluidization velocity of pulverized solid fuel 140, but lower than minimum fluidization velocity of oxygen carrying materials 130) in the bottom zone. In this embodiment, substantially no byproduct of solid fuels 140 and/or unconverted solid fuels may be present in the combustion reactor 300 and riser 350, because high gas velocity at the bottom of taper 161 allows only circulation of oxygen carrying materials 130, which may have coarser particle sizes. Byproducts of solid fuels 140 and/or unconverted solids may be separated and rejected from the system at the top of the reduction reactor 100, as described herein.

Now referring to FIG. 12, in another embodiment, solid fuels 140 with highly volatile contents may be injected below the taper 161. If necessary, additional oxidizing gas 150 may be injected below the solid fuel injection point in order to prevent the down flow of solid fuels 140. The flow direction of solid fuels 140 and oxygen carrying materials 130 may be countercurrent. This embodiment provides the maximum reaction zone for the volatiles from solid fuel 140. In this embodiment, substantially no byproduct of solid fuels 140 and/or unconverted solid fuels may be present in the combustion reactor 300 and riser 350, because high gas velocity at the bottom of the taper 161 may allows only global circulation of oxygen carrying materials 130, which may have coarser particle sizes. Byproducts of solid fuels 140 and/or unconverted solids may be separated and rejected from the system either at the top of reduction reactor 100 or along with the fresh solid fuels.

Now referring to FIG. 13, in another embodiment, the flow of solid fuels 140 and oxygen carrying material 130 is co-current. The reduction reactor 100 may be configured such that solid fuel 140 may flow downwards together with the oxygen carrying material 130 particles, whereas the oxidizing gas 150 may flows upwards. In this embodiment, the gas-solid-solid contacting mode may prefer low oxidizing gas 150 velocity in the lower section of the taper 161 and/or the remains of solids fuel 140 have similar hydrodynamic characteristics as the oxygen carrying materials 130. Any unconverted solid fuels 140 may be converted in the combustion reactor 300 with air and their byproducts may be separated from the oxygen carrying materials 130 before the oxygen carrying materials re-enter the reduction reactor 100. This conversion scheme may result in a carbon dioxide byproduct in the combustion reactor 300 gas outlet. In one embodiment, a solid-solid separation unit may be positioned before the combustion reactor 300, such as a fluidized bed, to separate oxygen carrying material 130 and unconverted fuel 140 based on their different hydrodynamic properties. This embodiment may allow for recycling of unconverted solid fuel 140 back to the reduction reactor 100 and may eliminate a carbon leak through the combustion reactor 300 and riser 350.

Referring to FIG. 14, in another embodiment, a non-volatile or low volatile solid fuel 140 such as, but not limited to, char or coke may be utilized, and the injection of solid fuels 140 may be made at the top of reduction reactor 100. The solid fuels may be introduced with recycled oxygen carrying materials 130 from the storage vessel and may flow co-currently downwards in the reduction reactor 100. In another embodiment, a series of fluidized beds may be utilized in a similar flow configuration.

Now referring to FIG. 15, in another embodiment, the gas-solid-solid contacting modes may be achieved by a combination of co-current and counter-current flow regimes of oxygen carrying materials 130 and remains of solid fuel 140. In this embodiment, the solid fuels 140 may have a wide range of particle sizes. The remains of solid fuel 140 with relative small particle size may follow the counter-current flow, whereas relative large sizes of solid fuels 140 may flow co-currently with respect to the oxygen carrying materials 130. Any unconverted solid fuels 140 may be converted in the combustion reactor 300 with air and their byproducts may be separated before re-entering the reduction reactor 100. This conversion scheme may result in a carbon dioxide byproduct in the combustion reactor gas outlet. One another embodiment, a solid-solid separation unit is positioned before the combustion reactor 100, such as a fluidized bed, to separate oxygen carrying material 130 and unconverted fuel 140 based on their different hydrodynamic property. This embodiment may allow for recycling unconverted solid fuel 140 back to the reduction reactor 100 and may eliminate the carbon leak through the combustion reactor 300 and riser 350.

Non-Mechanical Valve

The oxygen carrying materials in the chemical looping system may need to be transported from the reduction reactor 100 or oxidation reactor 200 to the combustion reactor 300 at regulated and desired flow rates. Because a conventional mechanical device such as table feeders or ball valves rely on the moving parts, operation cost may be expensive and the devices may be unreliable when they are applied in the chemical looping system where abrasive oxygen carrying materials and solid fuels are handled at elevated temperatures. Therefore, non-mechanical valves may be incorporated into the chemical looping systems disclosed herein at the combustion reactor inlet 400. The non-mechanical valve may transport the solids and be configured such as to prevent gas mixing between the reduction reactor 100 or the oxidation reactor 200 and the combustion reactor 300. As used herein, non-mechanical valve is any valve that does not rely on moving parts, other than for example a gas flow, in its operation. A non-mechanical valve may have a circuitous piping assembly.

Now referring to FIGS. 16A, 16B, 16C, and 16D, disclosed herein are several non-mechanical valve configurations. Generally, the non-mechanical valve may comprise a vertical standpipe 410, which is connected to the reduction reactor 100 or the oxidation reactor 200, at least one horizontal pipe 420, optionally at least one vertical pipe 470, and optionally an angle pipe 430. The vertical standpipe 410 may conceive the pressure build-up between the reduction reactor 100 or the oxidation reactor 200 and the combustion reactor 300 to prevent gas mixing. A zone seal gas stream 440 may be used to build up the pressure on the standpipe, which may prevent gas leakage between reactors. Inert gas such as, but not limited to, $N_2$ and Ar, steam or less-reactive gases like $CO_2$ may be used to seal the reactors. Preferred configurations of horizontal and angle pipes are determined by the particle characteristics of oxygen carrying materials and/or gas usage in the system. The global circulation rate of oxygen carrying material s mainly determined and controlled by the aeration gas stream 450 on the vertical standpipe of valves. Inert gas such as, but not limited to, $N_2$ and Ar, steam or less-reactive gases like $CO_2$ are preferred as an aeration gas. An additional aeration gas stream 460 may be installed to minimize the static zone and prevent fine accumulation.

The non-mechanical valve may be configured with a specific geometry, which may depend on the specification of the fuel conversion system. FIG. 16A shows an "L-valve", which is configured in the shape of an "L" and comprises a standpipe 410, which is connected to a horizontal pipe 420, which is connected to the combustion reactor 300. FIG. 16B shows an "extended L-valve", which is configured in the shape of an "L" with an extension and comprises a standpipe 410, which is connected to a horizontal pipe 420, which is connected to an angle pipe 430, which is connected to the combustion reactor 300. FIG. 16C shows a "J-valve", which is configured in the shape of n "J" and comprises a standpipe 410, which is connected to a horizontal pipe 420, which is connected to a vertical pipe 470, which is connected to an angle pipe 430, which is connected to the combustion reactor 300. FIG. 16D shows an "h-valve", which is configured in the shape of an "h" and comprises a standpipe 410, which is connected to a first horizontal pipe 420, which is connected to a first vertical pipe 470, which is connected to and a second horizontal pipe 420, which is connected to the combustion reactor 300.

Solid Flow Measurement System

In one embodiment, the fuel conversion systems disclosed herein may comprise a solids flow rate measurement device and may be positioned at the combustion reactor inlet stream 400. The solid flow measurement device may be coupled with a non-mechanical valve. In addition to the solid flow regulatory system, solids flow rate measurements may be installed to ensure the proper operation of the reactor system. It may be important to have knowledge of the oxygen carrying material circulation rate in the system in order to determine the stoichiometric balance between fuel feed and oxygen carrying material. Improper global solid circulation rate may result in solid agglomeration in the reduction reactor 100 and/or the oxidation reactor 200 and/or incomplete fuel conversion.

In one embodiment, the oxygen carrying material circulation is determined by using the characteristics of packed moving bed and low heat capacity of solids in the moving bed. A batch of cold particle may be added into the reactor through a lock-hopper system and the temperature trend of temperature measurement devices on the reactor wall may be monitored. In the given example in FIG. 17, the temperature measurement devices 480, such as, but not limited to thermocouples, may be installed on the reactor wall, arranged periodically down the vertical height of the reactor. The first thermocouple to show a large drop in temperature may indicate the level of the bed. Since the solids in the reactor move downward, the batch of cold solid lowers the temperature in a below region. This trend continues until the batch of solids comes to the reactor steady state temperature. The time lag between temperature drops between temperature measurement devices indicates the linear velocity of the oxygen carrying material particle. The linear velocity may be converted to the mass flowrate if the density of solid and cross sectional area of reactor is known.

In another embodiment, a solids flow rate measuring system may comprise a transport line with a transport window. The transport line may be located parallel to the main transport lines, such as between the solids separation device 600 and the solids storage vessel 700, and may ensure similar operational condition in the measuring device and the main reaction. The solids flow rate may be obtained from the solids flow rate in the measuring device multiplied by the area ratio between the cross-sections of the measuring line and the main transport line.

Design of Solid Fuel Injection System

No referring to FIG. 18, in one embodiment, the reduction reactor 100 comprises a solid fuel injection and distribution system 171 for a packed moving bed reactor configuration. The input rate of solid fuels may be controlled by utilizing a conventional solid handling device. The system 171 may comprise a storage unit of solid fuels 700 and a solid flow rate controller 174. The solid fuels are delivered to the transportation by the solid flow rate controller 174, and then a motive gas from a stream 176 may carry the solid fuels into the packed moving bed reactor 100. Generally, a neutral, non-reactive, or less-reactive gas is used to transport the solid fuels from the solid flow control device 174 into the packed moving bed reactor 100. In certain embodiments, oxidative gases such as $CO_2$, $H_2O$, and/or $O_2$ may be used as the motive gas. The size of the solid fuel transportation system 170 and motive gas velocity may be dependent on the properties of the solid fuels. The numbers and location of solid fuel injections may be also attuned based on the reactor size, reactivity of oxygen carrying materials with solid fuels, and/or solid fuel flow rates. An emergency shut-off valve 178 may be installed to prevent sudden back-flow of oxidizing gas to the solid fuel storage unit.

Now referring to FIGS. 18 and 19, in one embodiment, the solid fuels with a motive gas may be tangentially injected into the packed moving bed reactor 100 around a funnel shaped solid flow adjustor 180. FIG. 18 depicts the flow direction of solid fuels by a motive gas near the flow adjustor with a two-point tangential injection configuration. The oxygen carrying materials may pass through the funnel shaped solid flow adjustor 180, and they focus into the smaller surface area providing space for the solid fuels to be injected the oxygen carrying materials inside the funnel shaped solid flow adjustor 180. The solid flow adjustor 180 may coaxially disposed within a moving bed reactor, and the spacing between the solids flow adjustor and the walls of the first moving bed reactor defines a tangential flowpath for fuel entering the first moving bed reactor via multiple fuel injection ports. The funnel shaped solid flow adjustor 180 may be constructed from a porous material, such that smooth gas flow may be obtained. Internal reactor design may be an effective and efficient means to distribute the solid fuels in the packed moving bed.

The reduction reactor may comprise a flow static mixer. As the mixture of two solids passes through the static mixer, mixing between solid fuels and oxygen carrying materials may be achieved. Different shapes of static mixer may be applied to achieve different degree of mixing.

Now referring to FIGS. 18 and 20, in one embodiment, in which size of the reduction reactor 100 is large, the method of tangential solid fuel injection may not be preferred due to difficulty to distribute solid fuels among the oxygen carrying materials in the large vessel. Identical solid delivery system such as solid feeder and a motive gas may be used as the previous embodiment. However, different internal design and multiple solid feeders may be applied in the large vessel to ensure the solid fuel distribution. Multiple internal cones 184 may be installed to conceive the space for solid fuel injection throughout the vessel, such that multiple injection ports define a cone shape. The cones 184 may be funnel shaped and may be constructed from a porous material, such that substantially smooth gas flow may be obtained. The number of internal structures and solid feeding systems are dependent on the size of the reduction reactor 100 and/or properties of the solid fuels used. Emergency shut-off valves may be installed to prevent sudden back-flow of oxidizing gas to the solid fuel storage unit. Followed by the solid fuel injection, a static mixer 182 may be installed to achieve a higher degree of solid mixing in the moving bed. In one embodiment, the internal structures that assist vertical redistributions of both gas and solids are installed in the reduction reactor 100 and/or the oxidation reactor 200 reactor. These internals may assist the more even distributions for solid fuels across the reactor bed. In addition, gas injections along the reactor wall are provided in certain embodiments to allow better distributions of solid fuels.

Solids Separation System

In some embodiments, the reactor system is operated with relatively large particles, pellets, or agglomerates of oxygen carrying materials. In this embodiment, attrited/refused fines of oxygen carrying materials, byproduct of solid fuel and/or unconverted carbon may need to be separated since severe accumulations of byproduct of solid fuel, unconverted carbon and/or refused fine may cause oxygen carrying material deactivation and reactor plugage. During the continuous operation of the unit, all or portion of the fines, i.e. byproduct of solid fuel, unconverted carbon and refused oxygen carrying material powder, may need to be purged out from the system before the oxygen carrying materials re-enter the reduction reactor 100. FIG. 21 represents an embodiment of fine removal apparatus in the chemical looping process for solid fuel conversion. Although gas-solid separator may be used to separate out extremely fine materials, most of the byproduct of solid fuel and oxygen carrying material powders are removed before the storage vessel. The fine removal apparatus 600 utilizes the difference of hydrodynamic properties of particles to separate the byproducts of solid fuels, unconverted solid fuels or refused oxygen carrying material particles from the primary oxygen carrying material particles. Solid flow stream 520 contains fines generated in the combustor, riser and cyclone, and primary oxygen carrying material particles. Because the oxygen carrying materials are vigorously transported in the combustor, riser, and cyclone, most of the fines may be generated in these zones. These fines include refused oxygen carrying materials, byproducts of solid fuels or unconverted solid fuels. The mixture of fines and coarser particles are carried from the cyclone. Before these particles enter the receiver, the aeration gas is introduced at an inlet stream 630 to elutriate the fines within the mixture whereas the primary coarse oxygen carrying materials are circulated back into the receiver. Depending on the cut-off size of removed fines, the carrier gas velocity in the vertical standpipe section 620 may be adjusted. Generally, the carrier gas velocity in the standpipe 620 is set to be a slightly higher than a terminal velocity of desired fines. Generally, a neutral, non-reactive, less-reactive gas and/or air is used to separate fines in this apparatus 600. In some embodiments, the solids collected from the outlet stream 610 may be reprocessed and reused in the reactor system. The refused oxygen carrying materials and/or unconverted solid fuels may be separated from aeration gas by a gas-solid separator.

In some embodiments, entrained particles and gas from the riser 350 may by-pass the gas-solid separator 500. Alternatively, the riser 350 may be directly connected with the solids separator at a slanted angle. Inlet stream 520 may contain particles that need to be separated. For this embodiment, the solids separation system 600 is preferred to have much larger cross-sectional area compared to the solid conveying system 350, such as a riser, in order to avoid the entrainment of particles. As it is mentioned in the previous embodiment, separated particles in the outlet stream 610 and may be eligible to be reprocessed for recycle in the chemical looping system.

Additional aeration gas may be input from the bottom of the solid storage vessel 700, in order to separate fines from the primary oxygen carrying materials that passed the solids separation device 600 and are already settled in the solid storage vessel 700. A small gas outlet is installed at the top of the solid storage vessel 700 to eject the fluidized fines from the surface level of oxygen carrying materials.

Combustion Reactor and Riser Design

Pressure fluctuations occasionally occur in the chemical looping system mainly due to slugging effects of large particle size oxygen carrying materials experienced in the combustion reactor 300. The solid slugging in the combustion reactor 300 causes sudden loss/gain of solids inventory in storage vessel and sudden change in gas and solid flow.

Now referring to FIGS. 22A, 23B, and 23C, in one embodiment, the combustion reactor 300 may reduce the slugging during the fluidization of oxygen carrying materials. Possible ways which may be adopted for reducing slugging in the combustion reactor 300 include, but are not limited to, special design on the shape and size of the combustion reactor 300, and the addition of internal devices. In one embodiment, a tapered bed with larger cross-sectional area on the top, as shown in FIG. 22A, may greatly reduce the gas and solids fluctuation near the surface of solids level. In another embodiment, as shown in FIG. 22B, inserting the lower end of the riser 350 inside the combustion reactor 300 may effectively decrease slugging by preventing solids from colliding with the wall. In another embodiment, as shown in FIG. 22C, internal devices including vertical internals 304 and horizontal internals 302 may also reduce the slugging by separating the combustion reactor 300 into several parts and limit the size of each part. Other possible methods to reduce slugging include screws or agitators, which may prevent slugging by changing the local flowability of solids.

In one embodiment, steam may be produced by recovering heat from the exothermic reaction in the combustion reactor 300 and/or the riser 350. In this embodiment, the heat in the combustion reactor 300 and/or the riser 350 may be transferred to steam generation resulting in a temperature decrease in combustion reactor 300 and/or the riser 350. Since the temperature decrease contracts the gas volume, the gas velocity may be lowered in the upper section of combustion reactor 300 and/or the riser 350. If the gas velocity in the riser is not sufficient to transport the particles back to the storage vessel, additional gas injection ports may be installed on various points of the riser 350.

It is noted that recitations herein of a component of the present disclosure being "configured" in a particular way, to embody a particular property, or function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Rather, the claims appended hereto should be taken as the sole representation of the breadth of the present disclosure and the corresponding scope of the various embodiments described herein. Further, it will be apparent that modifications and variations are possible without departing from the scope of the appended claims. More specifically, although some aspects of the present disclosure are identified herein as preferred or particularly advantageous, it is contemplated that the present disclosure is not necessarily limited to these aspects.

The invention claimed is:

1. A system for converting fuel comprising:
a first moving bed reactor comprising at least one tapered section and multiple injection gas ports in a tangential injection configuration, the multiple injection gas ports being configured to tangentially inject a fuel into the first moving bed reactor, wherein the first moving bed reactor is configured to reduce an oxygen carrying material with a fuel by defining a countercurrent flowpath for the fuel relative to the oxygen carrying material, wherein the first moving bed reactor has multiple tapered sections that are aligned in parallel, such that the first moving bed reactor has multiple outlet streams, and wherein the multiple tapered sections emanate from a bottom section of the first moving bed reactor;
a second reactor communicating with the first moving bed reactor operable to receive an oxygen source, wherein the second reactor is configured to regenerate the reduced oxygen carrying material by oxidation; and
a non-mechanical valve comprising a circuitous piping assembly disposed between the first moving bed reactor and the second reactor, and at least one gas opening configured to receive a gas stream, the gas stream being operable to reduce gas leakage between the first moving bed reactor and the second reactor.

2. The system for converting fuel of claim 1, wherein the second reactor is a countercurrent moving bed reactor.

3. The system for converting fuel of claim 1, wherein the circuitous piping assembly comprises at least one vertical standpipe.

4. The system for converting fuel of claim 1, wherein the injection gas ports are disposed annularly on at least one tapered section.

5. The system for converting fuel of claim 1, further comprising a solids flow adjustor coaxially disposed within the first moving bed reactor.

6. The system for converting fuel of claim 5, wherein the spacing between the solids flow adjustor and the walls of the first moving bed reactor defines a tangential flowpath for fuel entering the first moving bed reactor via the multiple fuel injection ports.

7. The system for converting fuel of claim 5, wherein the solid flow adjustor is funnel shaped.

8. The system for converting fuel of claim 1, wherein multiple injector ports define a cone shape.

9. The system for converting fuel of claim 1, wherein the multiple injection gas ports are disposed along the tapered section.

10. A system for converting fuel comprising:
   a first moving bed reactor comprising at least one tapered section and multiple injection gas ports in a tangential configuration, the multiple injection gas ports being configured to tangentially inject a fuel into the first moving bed reactor, wherein the first moving bed reactor is configured to reduce an oxygen carrying material with a fuel by defining a countercurrent flowpath for the fuel relative to the oxygen carrying material;
   a second reactor communicating with the first moving bed reactor operable to receive an oxygen source, wherein the second reactor is configured to regenerate the reduced oxygen carrying material by oxidation; and
   a non-mechanical valve comprising a circuitous piping assembly disposed between the first moving bed reactor and the second reactor, and at least one gas opening configured to receive a gas stream, the gas stream being operable to reduce gas leakage between the first moving bed reactor and the second reactor,
   wherein:
       the second reactor is a countercurrent moving bed reactor;
       the circuitous piping assembly comprises at least one vertical standpipe;
       the injection gas ports are disposed annularly on at least one tapered section;
       wherein the first moving bed reactor has multiple tapered sections that are aligned in parallel, such that the first moving bed reactor has multiple outlet streams; and
       wherein the multiple tapered sections emanate from a bottom section of the first moving bed reactor.

11. The system of claim 10, wherein multiple injector ports define a cone shape and the multiple injection gas ports are disposed along the tapered section.

12. A system for converting fuel comprising:
   a first moving bed reactor comprising at least one tapered section and multiple injection gas ports in a tangential injection configuration, the multiple injection gas ports being configured to tangentially inject a fuel into the first moving bed reactor, wherein the first moving bed reactor is configured to reduce an oxygen carrying material with a fuel by defining a countercurrent flowpath for the fuel relative to the oxygen carrying material, wherein the first moving bed reactor has multiple tapered sections that are aligned in parallel, such that the first moving bed reactor has multiple outlet streams, and wherein the multiple tapered sections emanate from a bottom section of the first moving bed reactor;
   a second reactor communicating with the first moving bed reactor operable to receive an oxygen source, wherein the second reactor is configured to regenerate the reduced oxygen carrying material by oxidation; and
   a non-mechanical valve comprising a circuitous piping assembly disposed between the first moving bed reactor and the second reactor, and at least one gas opening configured to receive a gas stream, the gas stream being operable to reduce gas leakage between the first moving bed reactor and the second reactor; and
   a solids flow adjustor coaxially disposed within the first moving bed reactor, wherein the spacing between the solids flow adjustor and the walls of the first moving bed reactor defines a tangential flowpath for fuel entering the first moving bed reactor via the multiple fuel injection ports in the tangential injection configuration, and wherein the solid flow adjustor is funnel shaped.

* * * * *

UNITED STATES PATENT AND TRADEMARK OFFICE
CERTIFICATE OF CORRECTION

| | | |
|---|---|---|
| PATENT NO. | : 9,903,584 B2 | Page 1 of 1 |
| APPLICATION NO. | : 14/116636 | |
| DATED | : February 27, 2018 | |
| INVENTOR(S) | : Liang-Shih Fan et al. | |

It is certified that error appears in the above-identified patent and that said Letters Patent is hereby corrected as shown below:

In the Specification

Column 1, Line 7, please insert the following paragraph:
-- STATEMENT OF GOVERNMENT INTEREST
This invention was made with government support under grant number DE-AR0000017 awarded by the Department of Energy. The government has certain rights in the invention. --

Signed and Sealed this
Twenty-fifth Day of August, 2020

Andrei Iancu
*Director of the United States Patent and Trademark Office*